(12) United States Patent
Sarshar et al.

(10) Patent No.: US 8,949,198 B2
(45) Date of Patent: Feb. 3, 2015

(54) SYSTEMS AND METHODS FOR BUILDING A UNIVERSAL MULTIMEDIA LEARNER

(71) Applicants: Nima Sarshar, Fremont, CA (US); Sudhir Kumar Singh, San Jose, CA (US); Vwani P. Roychowdhury, Los Angeles, CA (US)

(72) Inventors: Nima Sarshar, Fremont, CA (US); Sudhir Kumar Singh, San Jose, CA (US); Vwani P. Roychowdhury, Los Angeles, CA (US)

(73) Assignee: Haileo Inc., Santa Clara, CA (US)

( * ) Notice: Subject to any disclaimer, the term of this patent is extended or adjusted under 35 U.S.C. 154(b) by 0 days.

(21) Appl. No.: 13/894,313

(22) Filed: May 14, 2013

(65) Prior Publication Data
US 2013/0325864 A1    Dec. 5, 2013

Related U.S. Application Data

(63) Continuation of application No. 13/091,459, filed on Apr. 21, 2011, now Pat. No. 8,463,756.

(51) Int. Cl.
   *G06F 17/30* (2006.01)

(52) U.S. Cl.
   CPC .... *G06F 17/30017* (2013.01); *G06F 17/30784* (2013.01); *G06F 17/30731* (2013.01); *G06F 17/30743* (2013.01)
   USPC .......................... 707/690; 707/694; 707/737

(58) Field of Classification Search
   None
   See application file for complete search history.

(56) References Cited

U.S. PATENT DOCUMENTS

2004/0249809 A1*  12/2004  Ramani et al. .......... G06F 17/30
2009/0080853 A1*  3/2009   Chen et al. .............. G06F 17/30

* cited by examiner

*Primary Examiner* — Son T Hoang
(74) *Attorney, Agent, or Firm* — Orrick, Herrington & Sutcliffe LLP

(57) ABSTRACT

A unified framework to understand multimedia signals utilizes the loosely annotated multimedia data on the Web, analysis it in various signal domains, such as text, image, audio and combinations thereof, and builds an association graph called the "Multimedia Brain," which basically comprises visual signals, audio signals, text phrases and the like that capture a multitude of objects, experiences and their attributes and the links among them that capture similar intent or functional and contextual relationships.

2 Claims, 43 Drawing Sheets

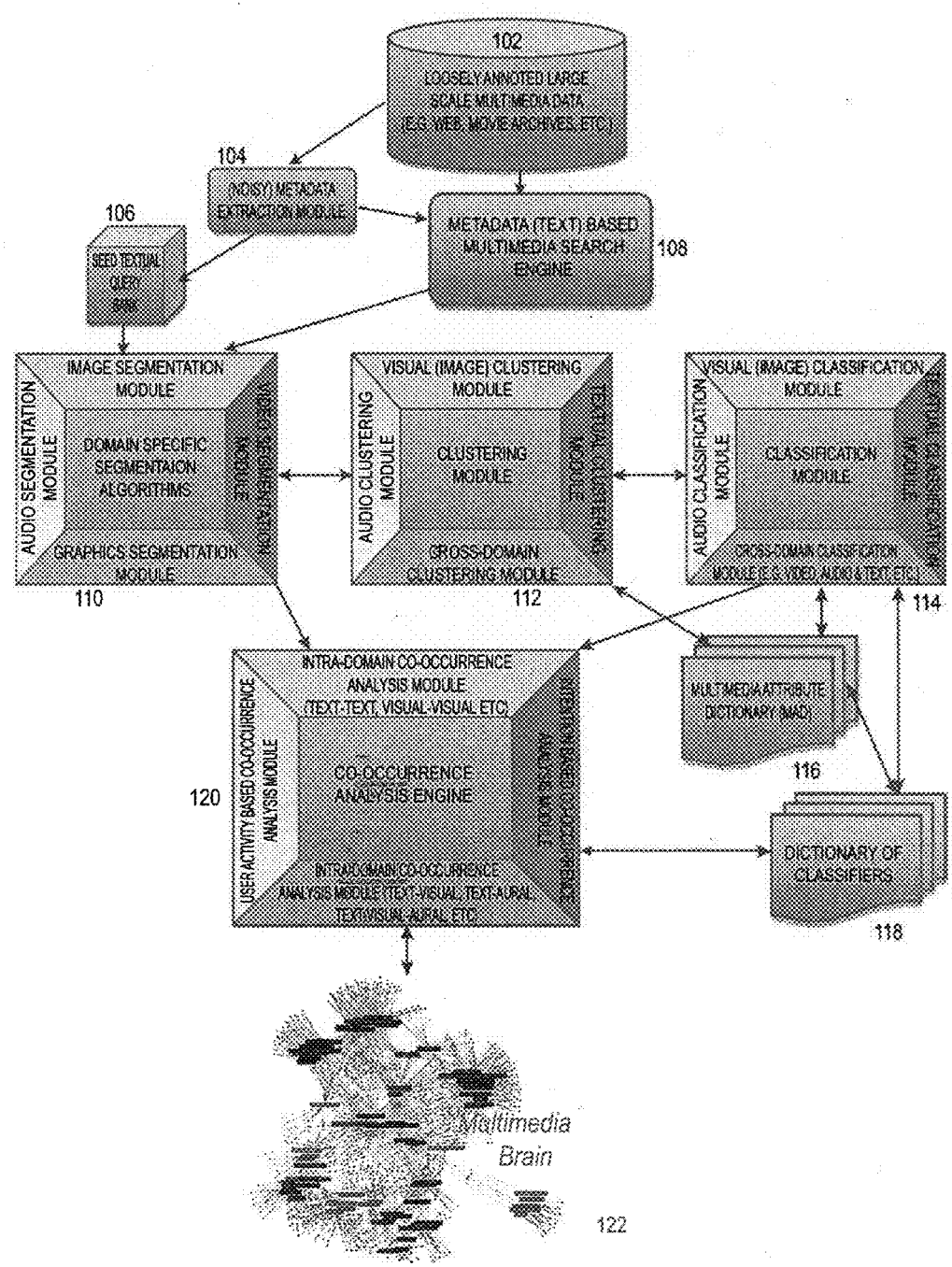
Figure 1: The Universal Learner

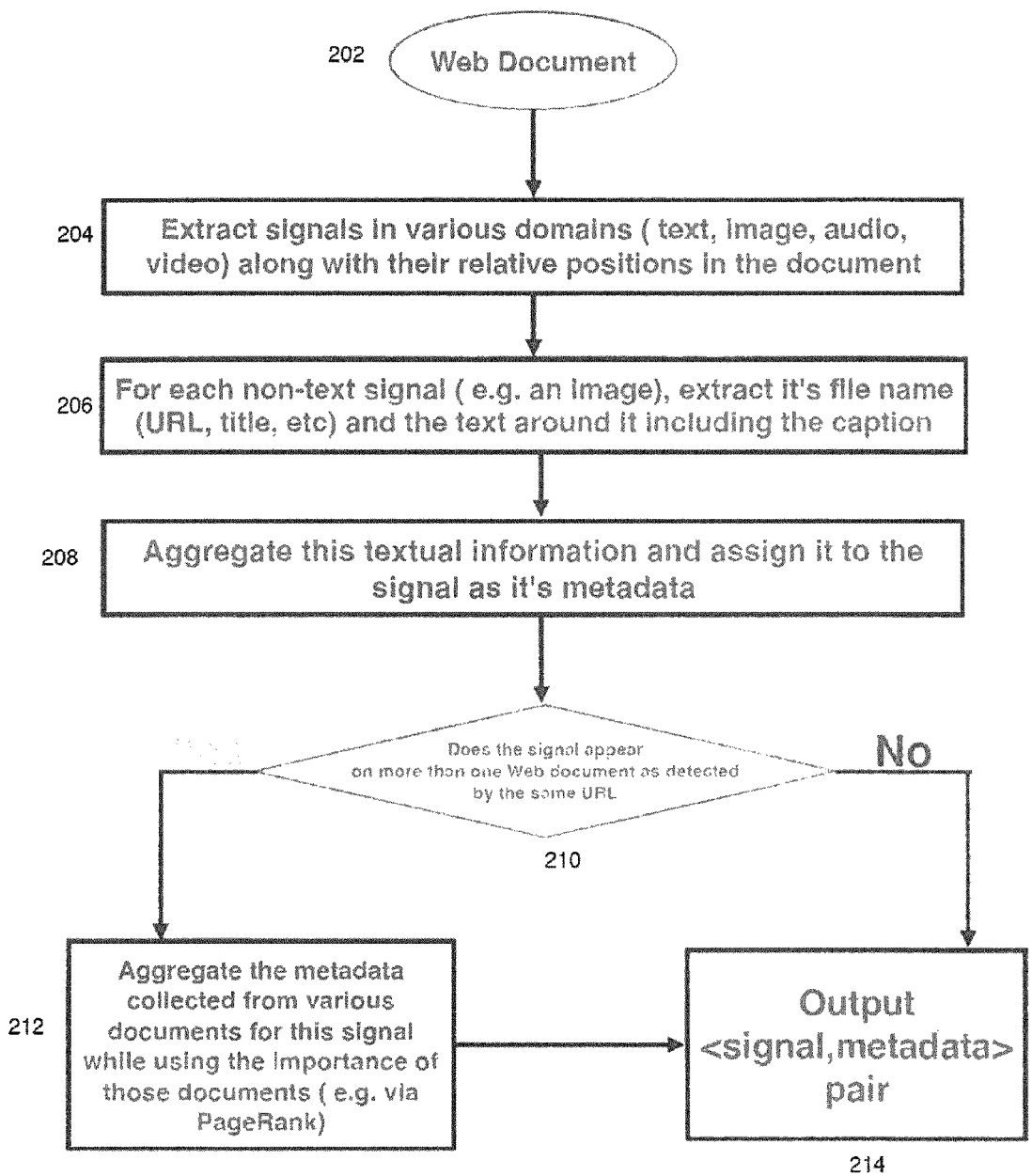
Figure 2: (Noisy) Metadata Extraction Module [104]

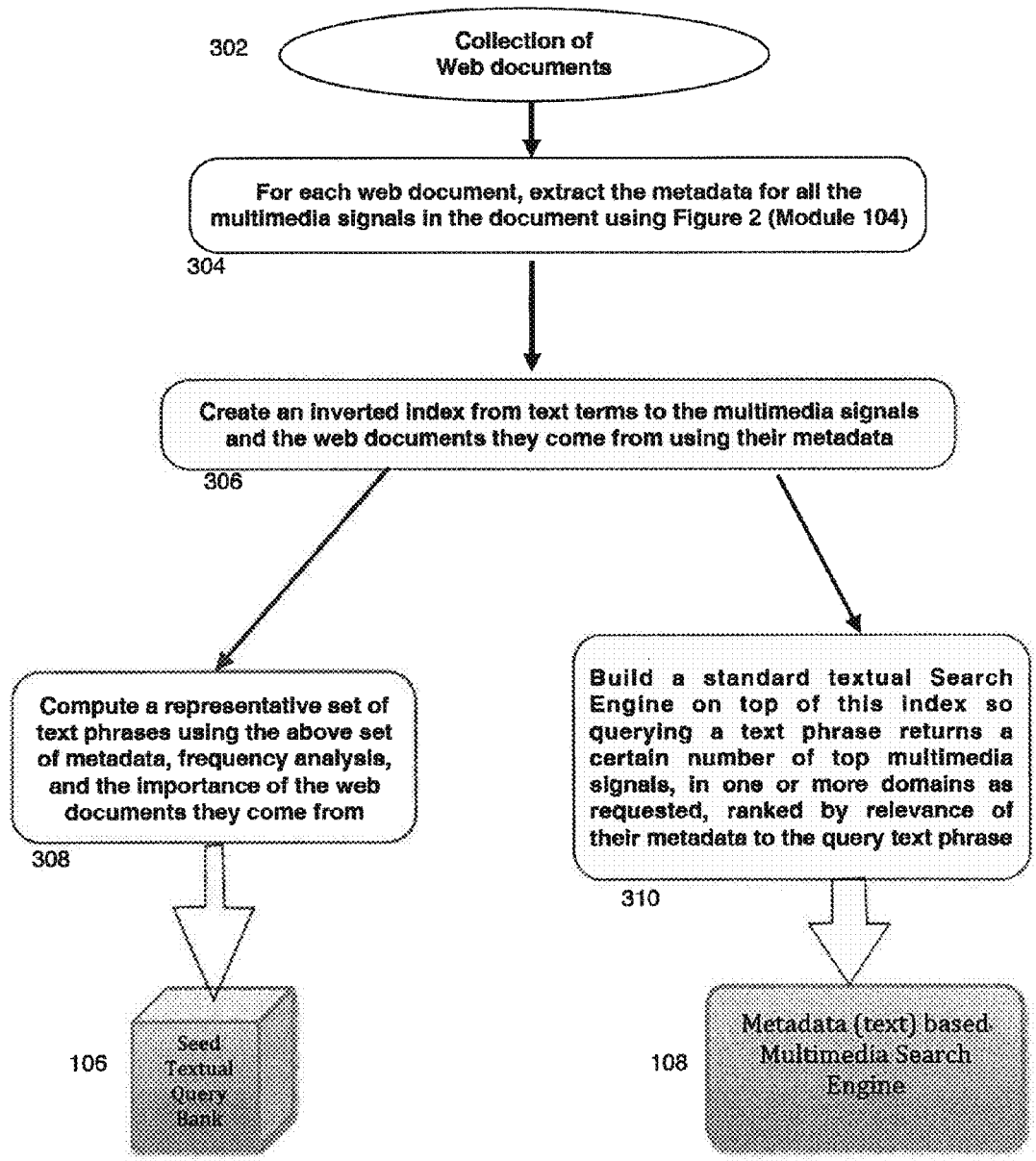
Figure 3: Domain specific indexing module

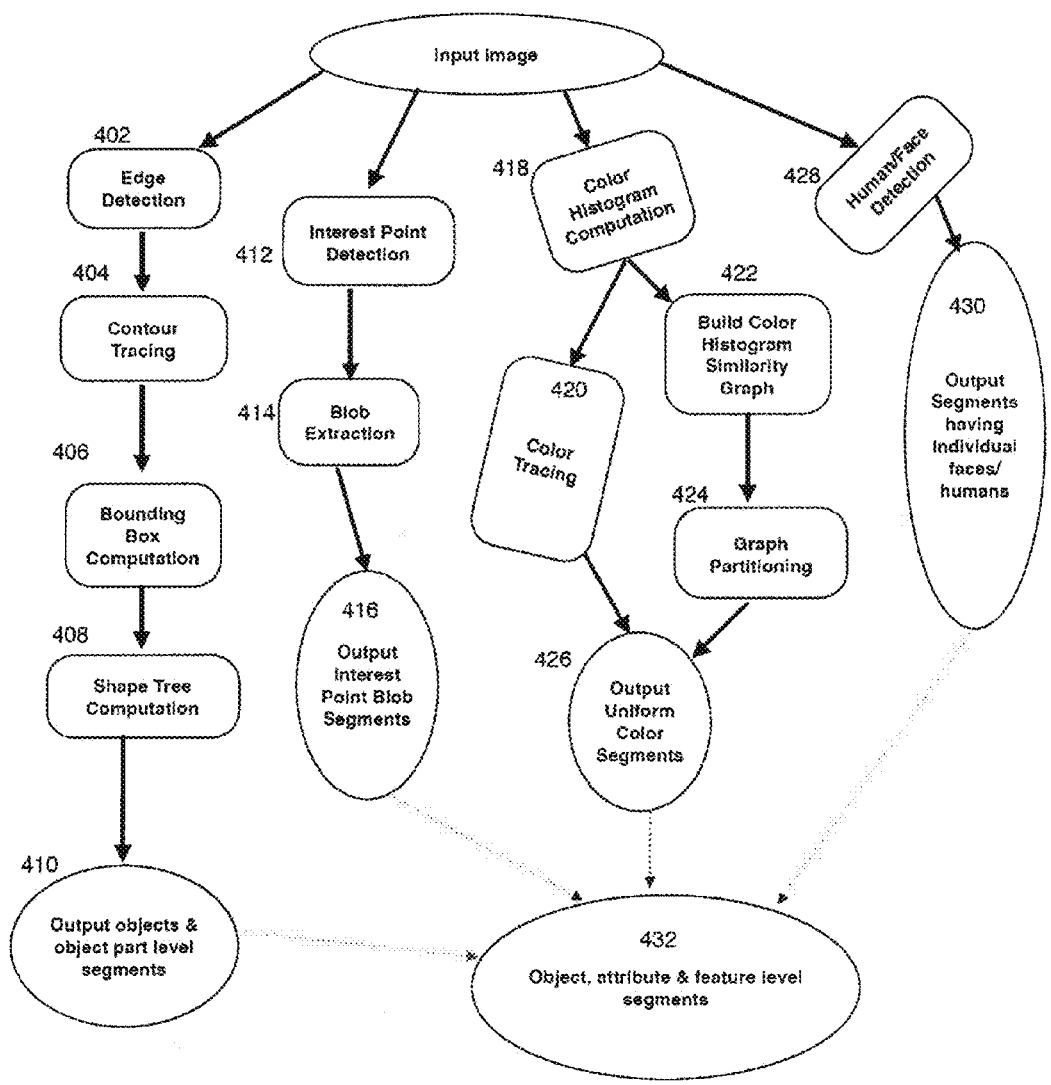
Figure 4: Image Segmentation Module

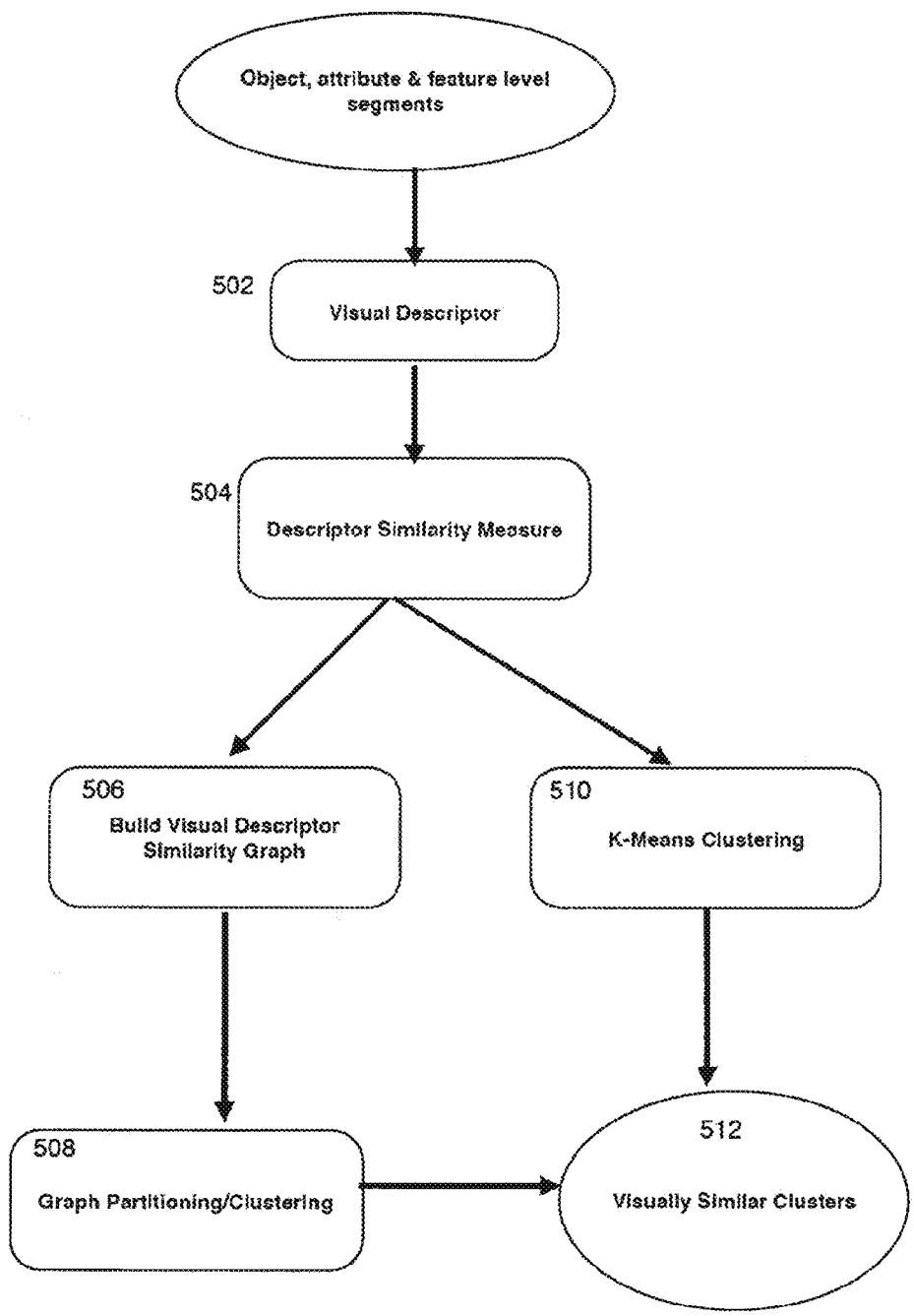
Figure 5: Visual Clustering Module

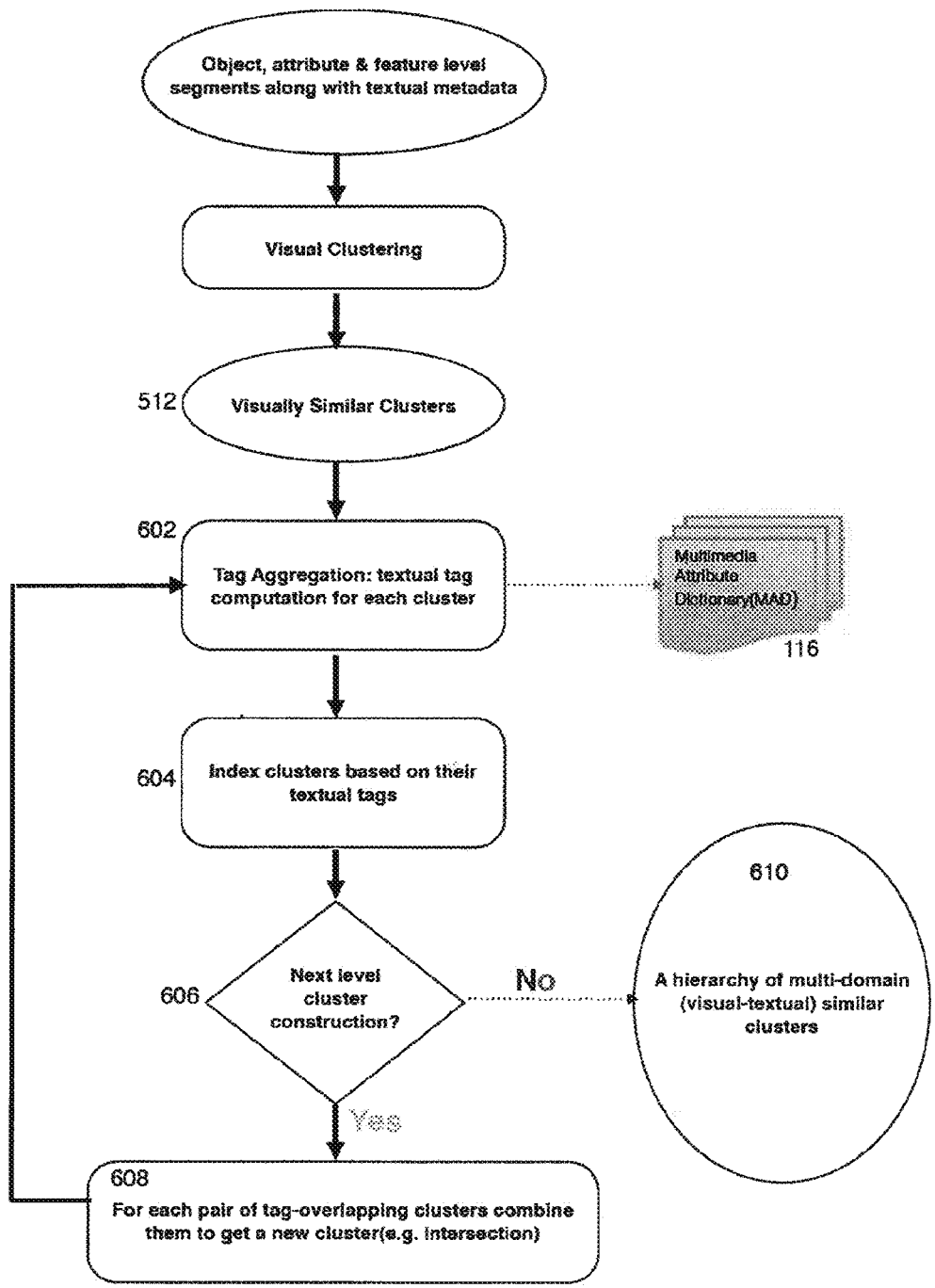
Figure 6 : Visual-Textual Clustering Module

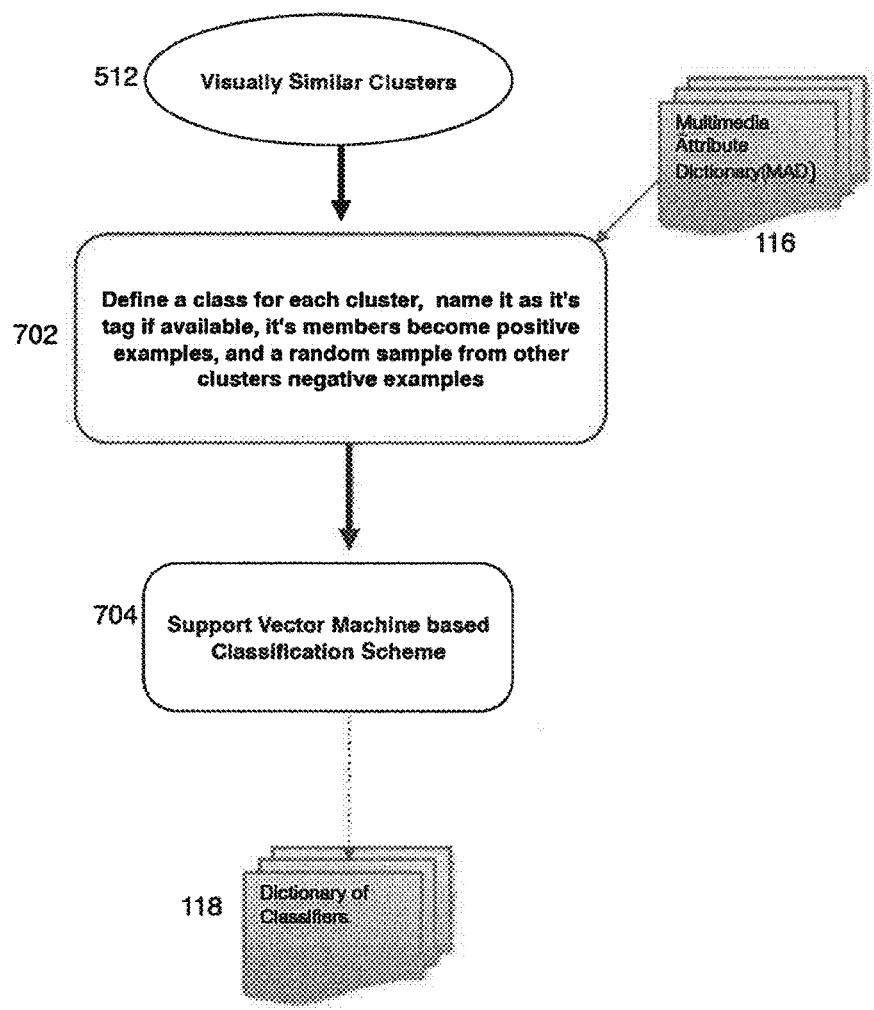
Figure 7: Visual Classification Module

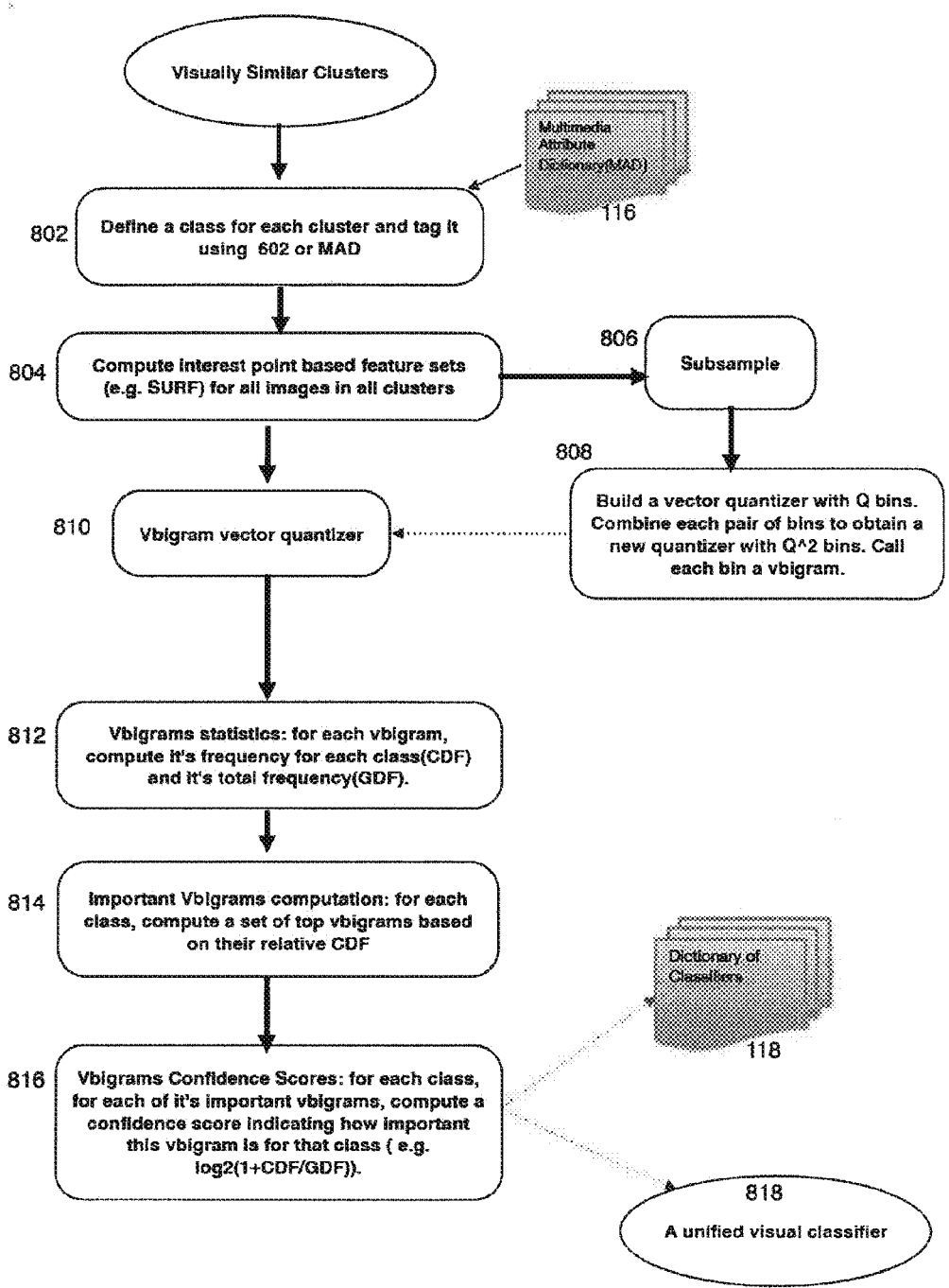
Figure 8 : Alternative Visual Classification Module

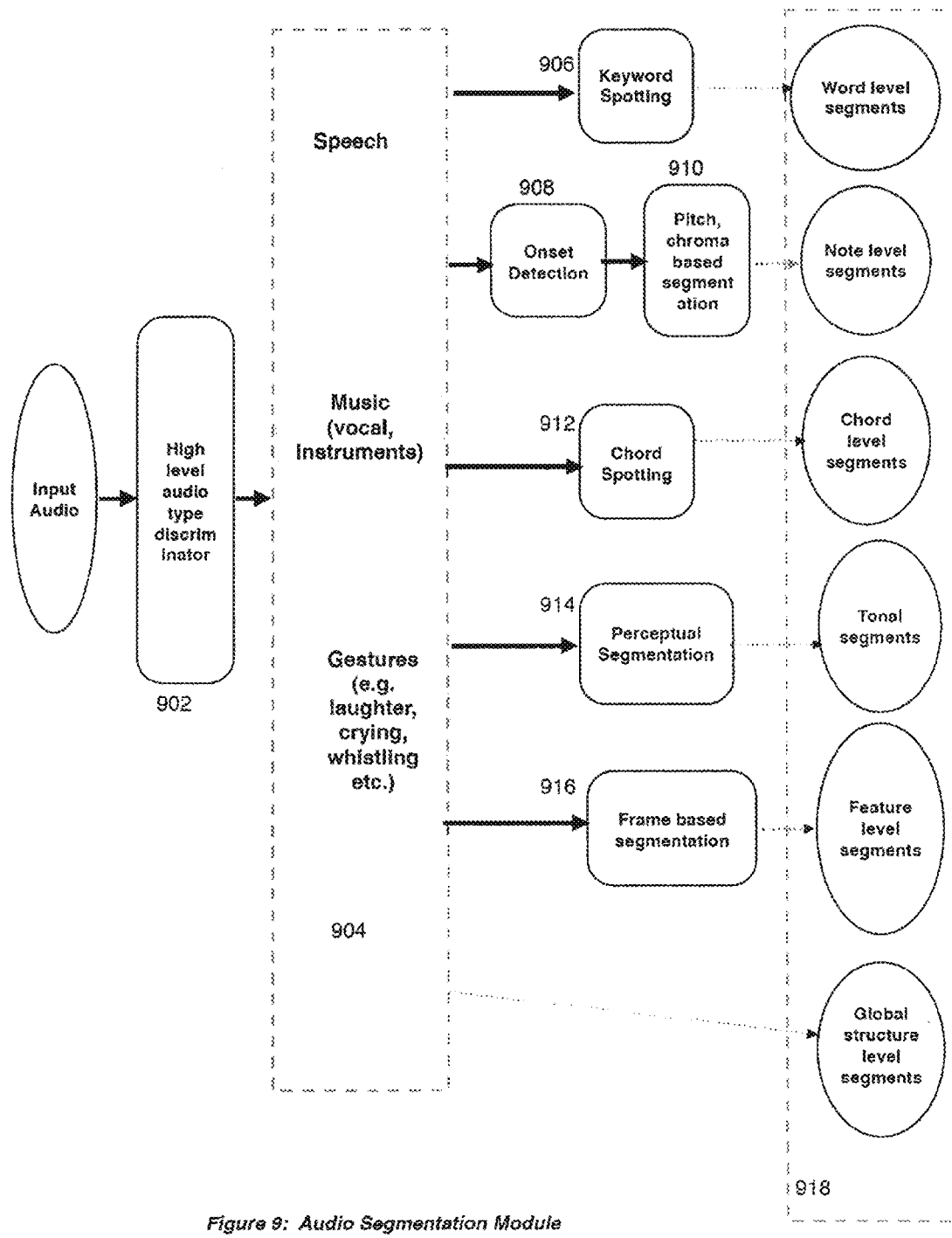
Figure 9: Audio Segmentation Module

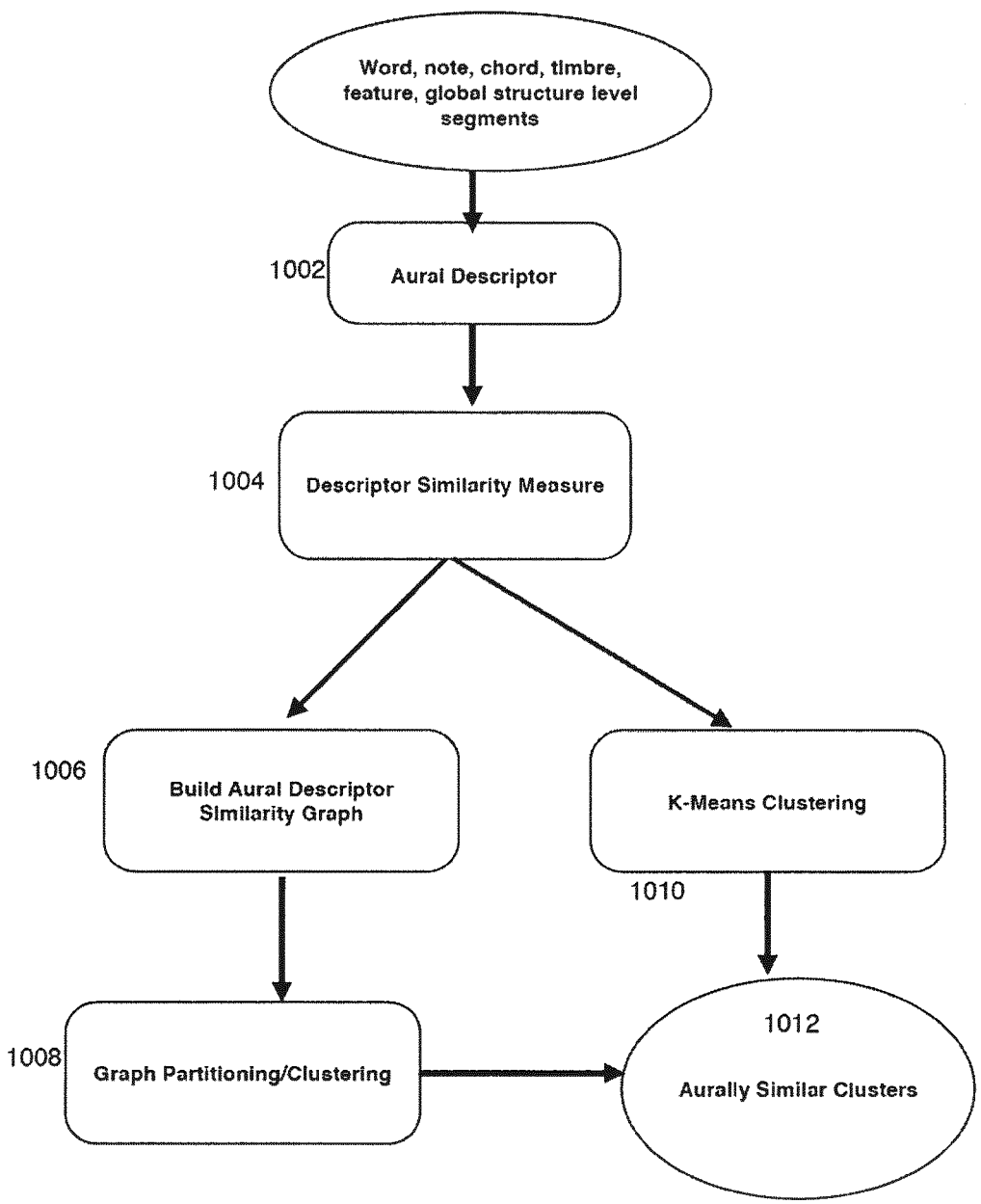
Figure 10: Audio Clustering Module

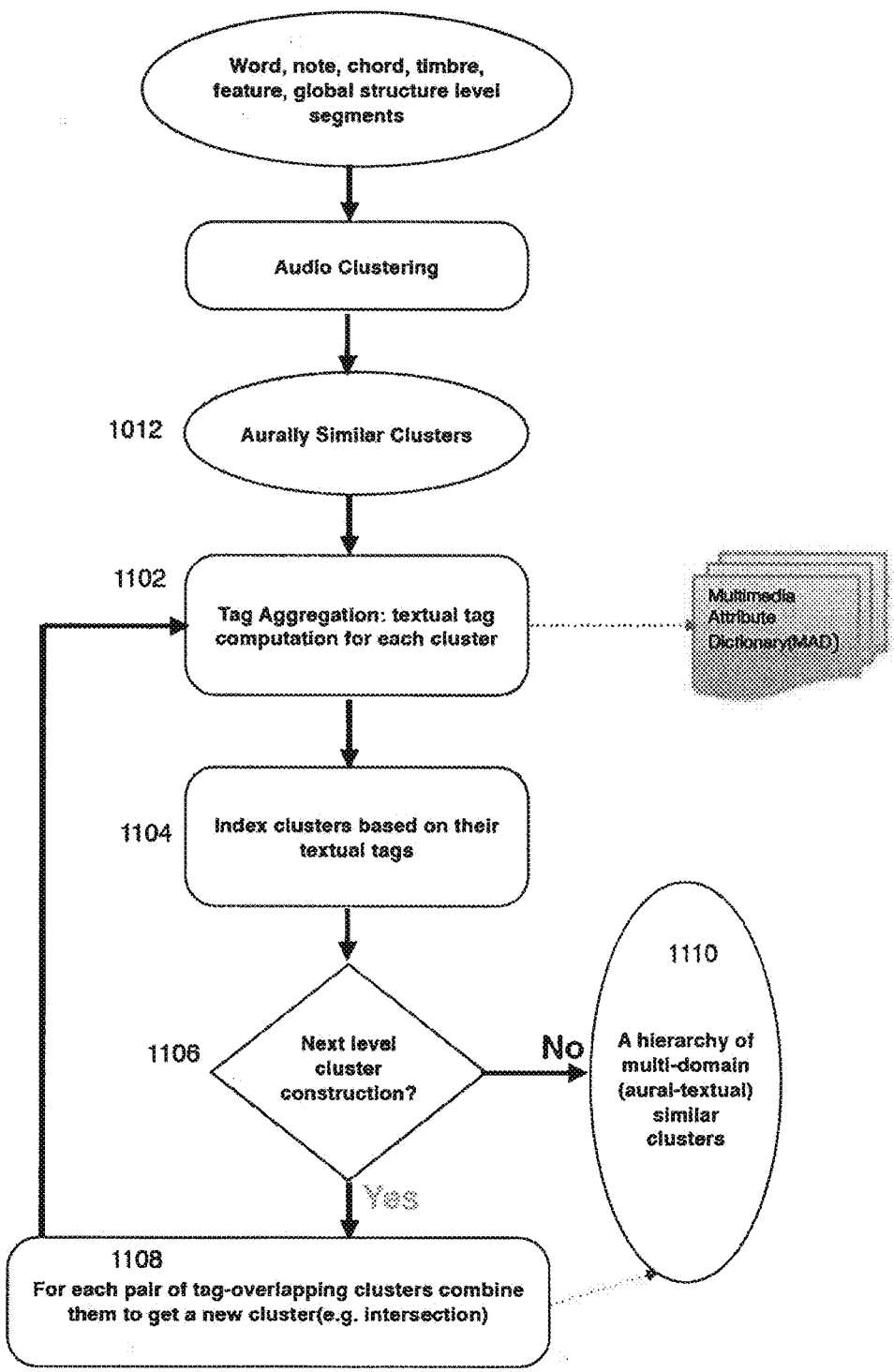
Figure 11 : Audio-Textual Clustering Module

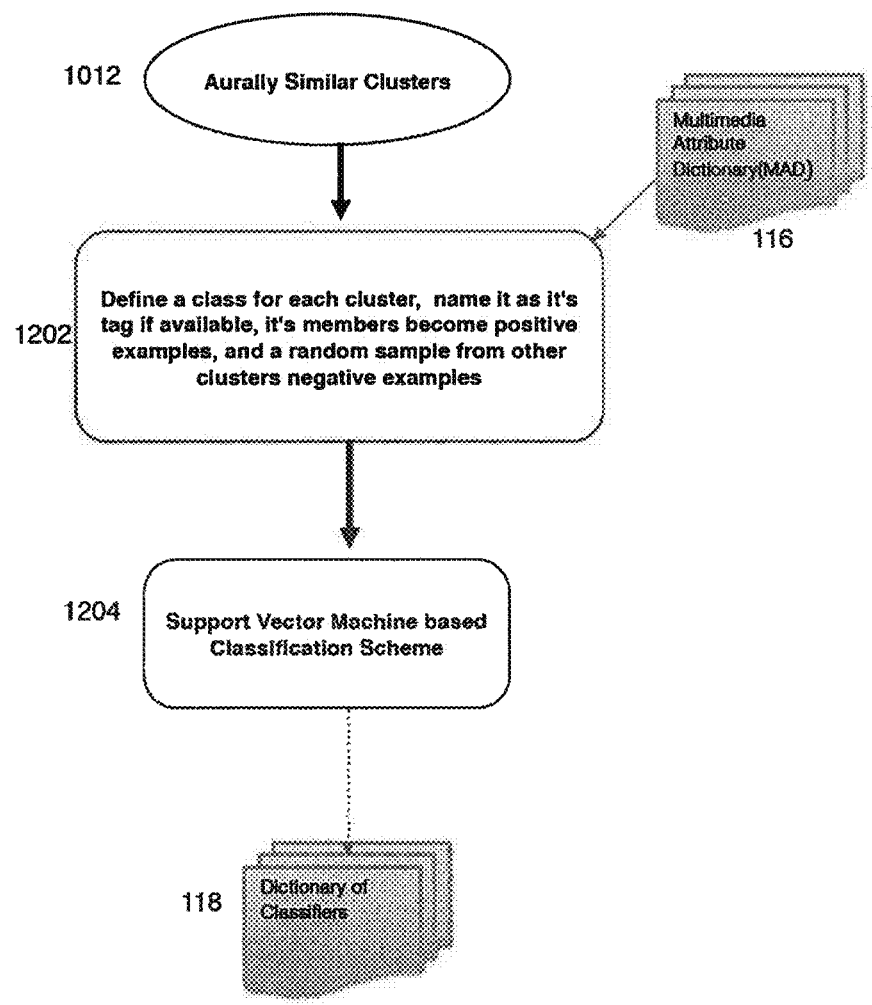
Figure 12 : Audio Classification Module

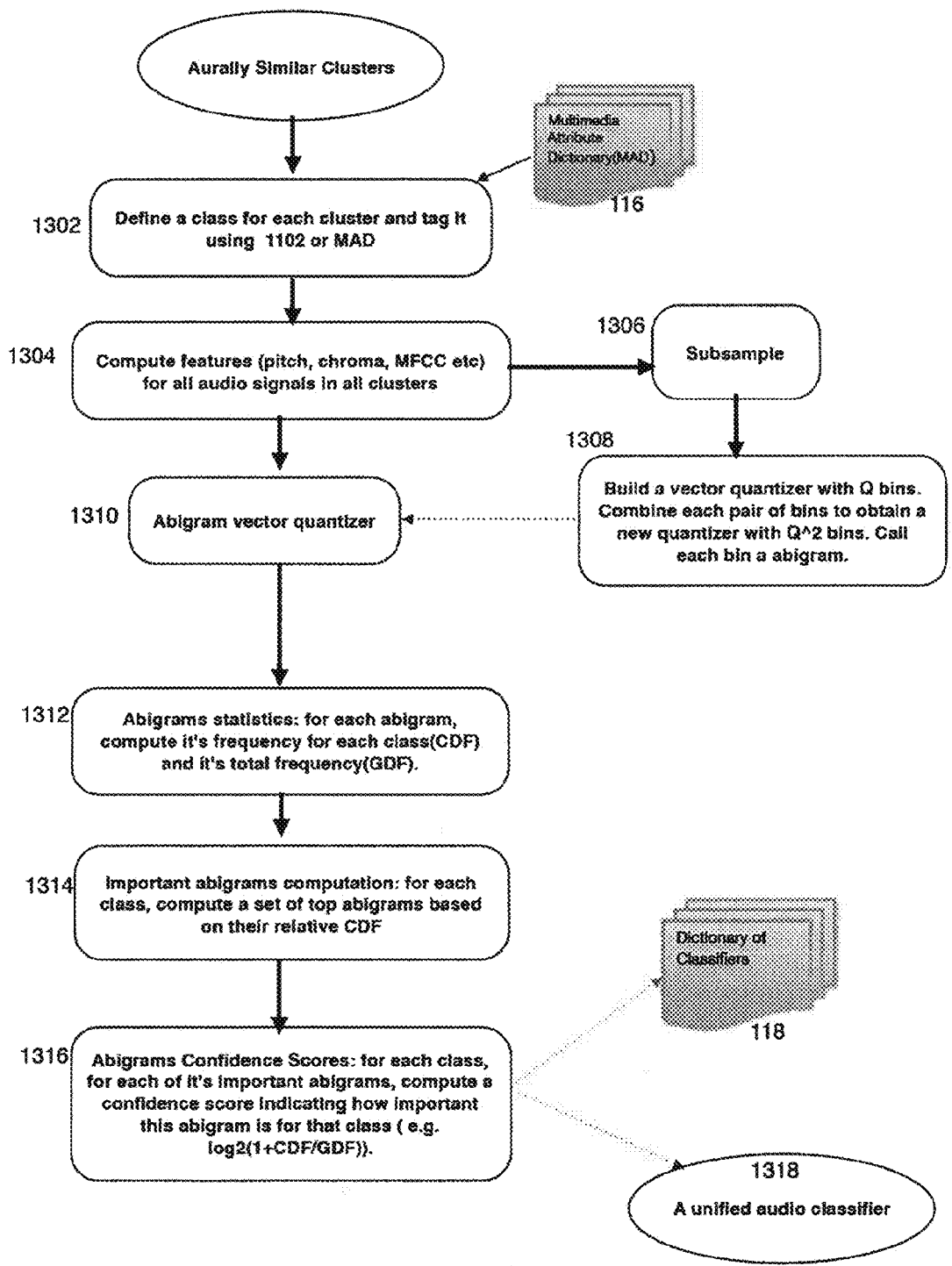
Figure 13 : Alternative Audio Classification Module

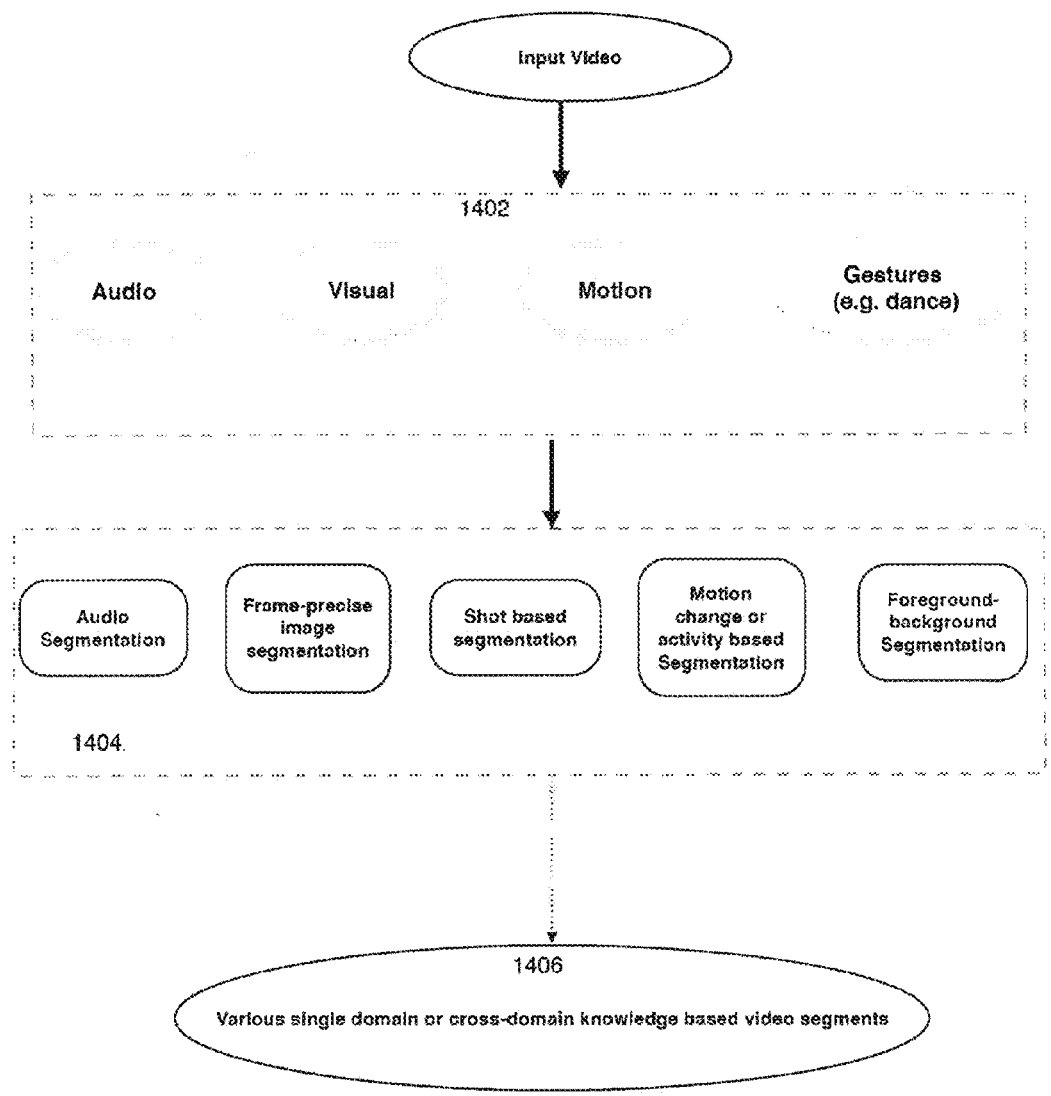
Figure 14 : Video Segmentation Module

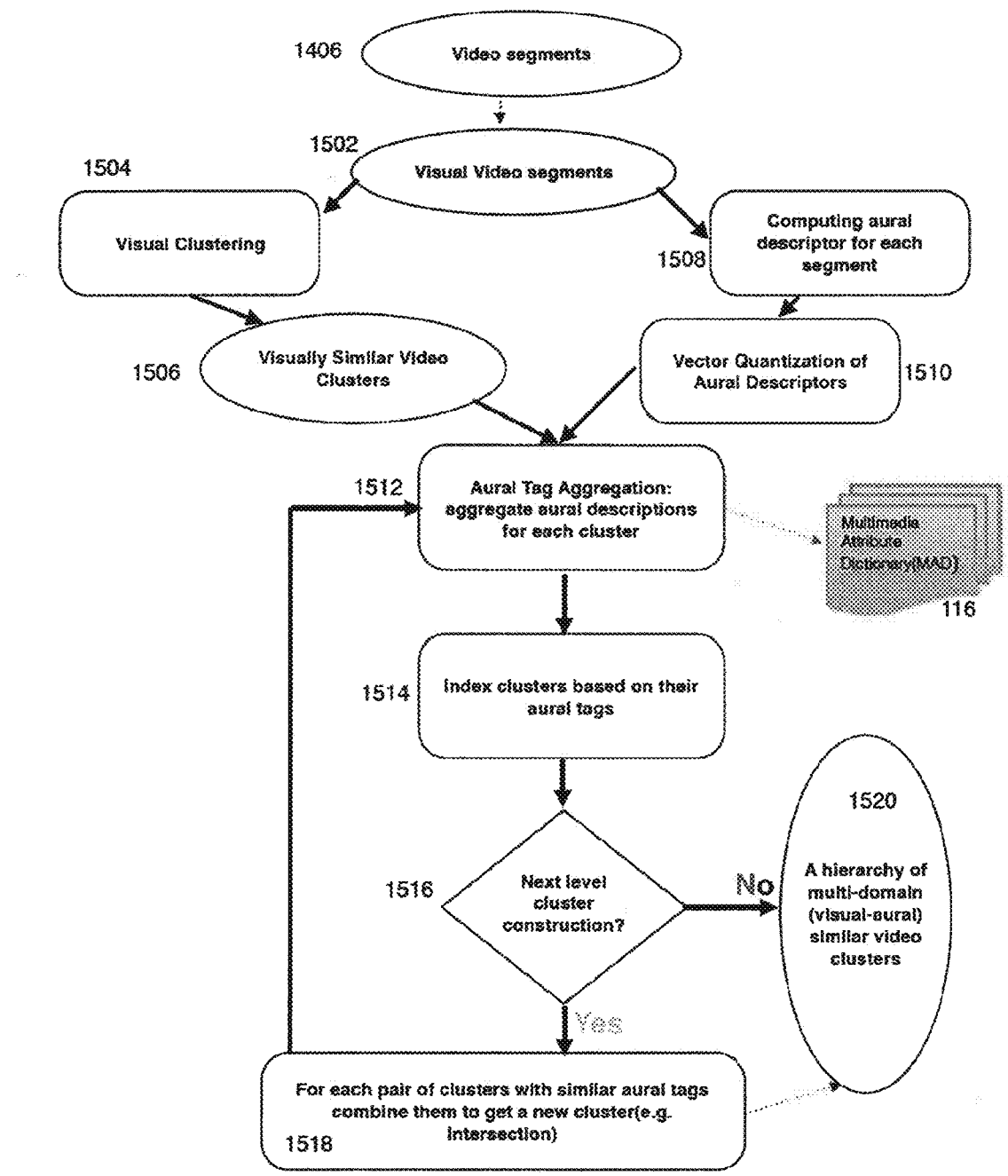
Figure 15 : Video Clustering Module

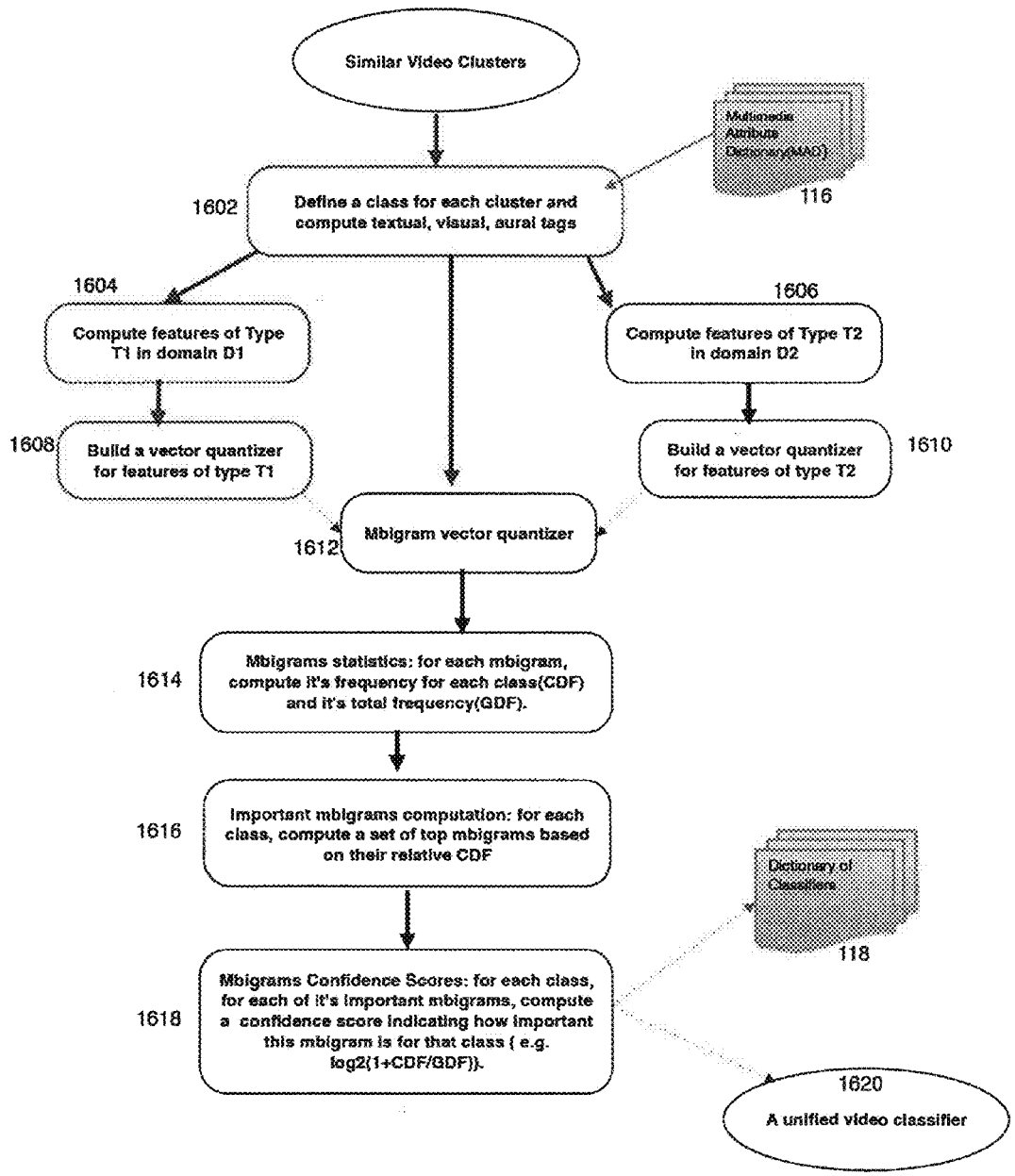
Figure 16 : Video Classification Module

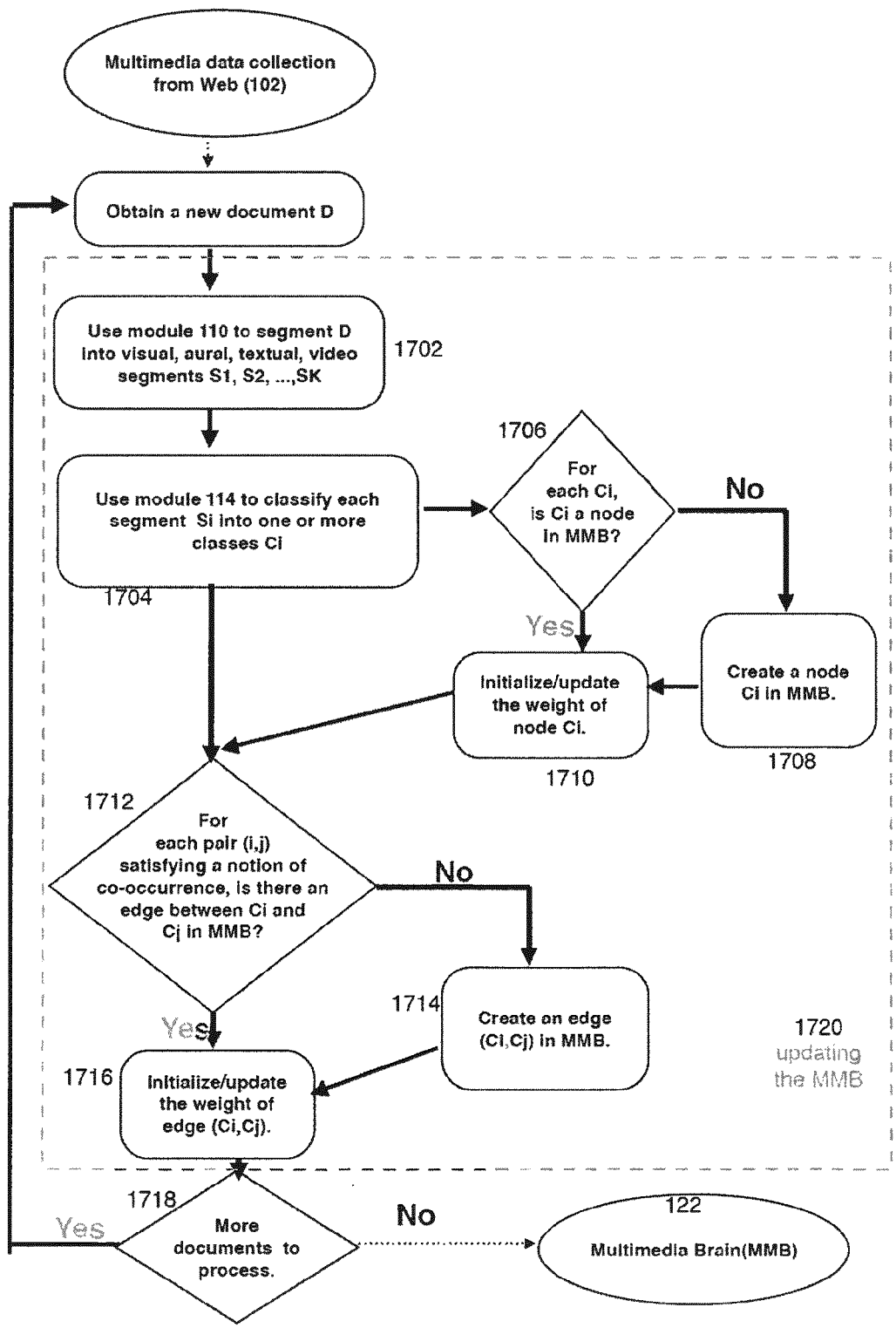
Figure 17 : Co-occurrence Analysis Engine

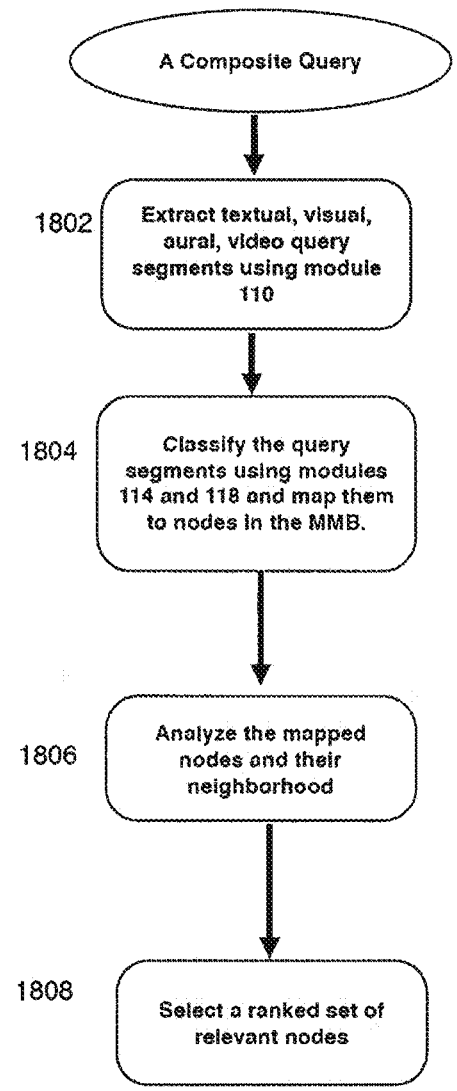
Figure 18: Performing multi-attribute multi-domain composite queries

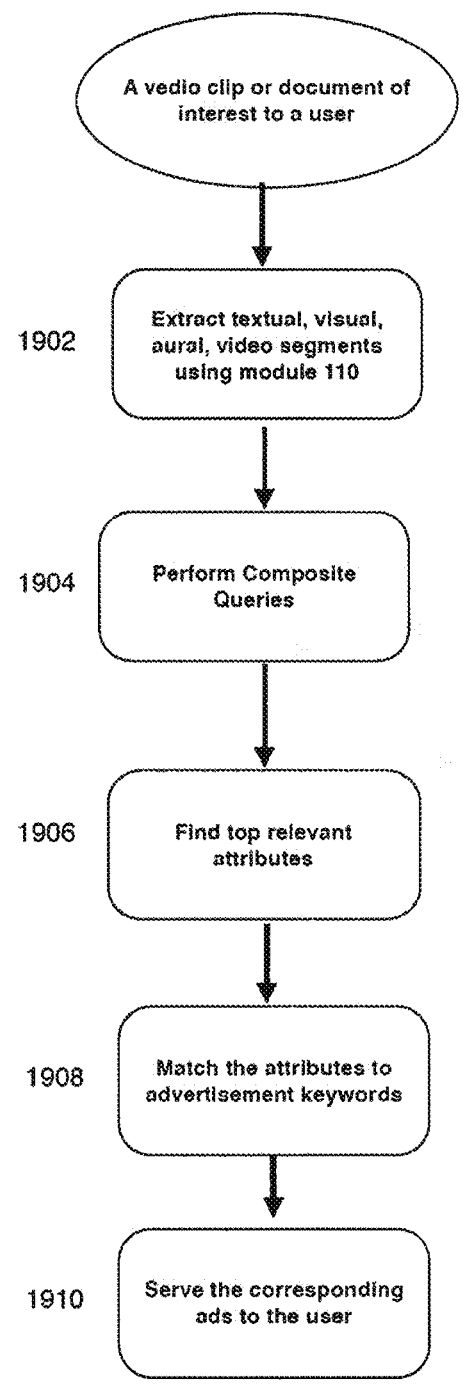
Figure 19: Process of serving relevant ads to users based on their multimedia clip of interest

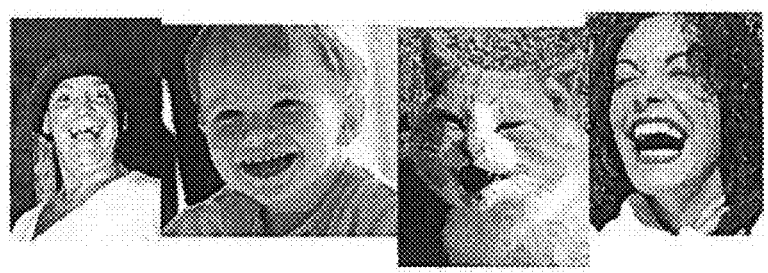
Fig. 20: Examples of images returned by Yahoo! Images search engine for the query "laughter"
Fig. 21: Examples of images returned by Yahoo! Images for the query "happy".

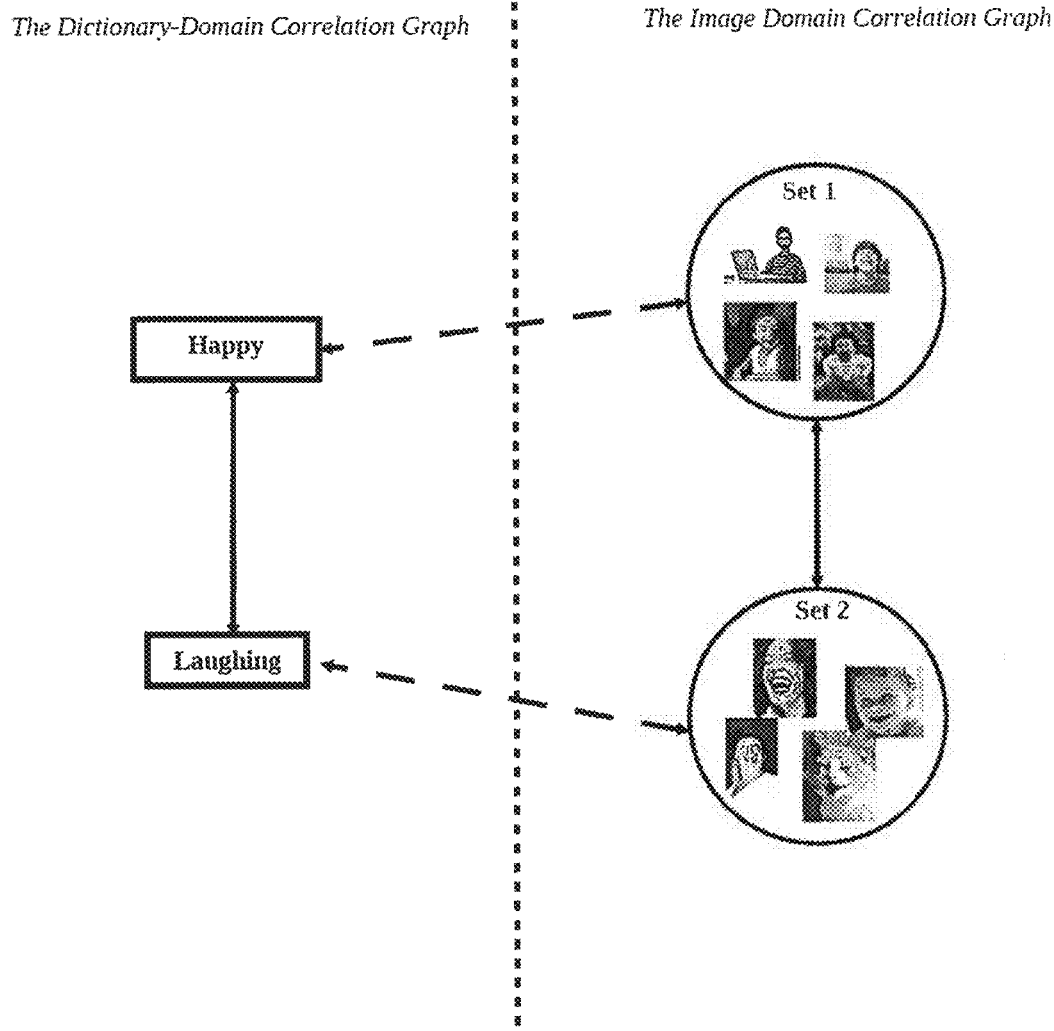
Fig. 22: Two collections of images downloaded from Yahoo! Images, Set 1 corresponding to "Happy", and Set 2 corresponding to the term "Laughing"

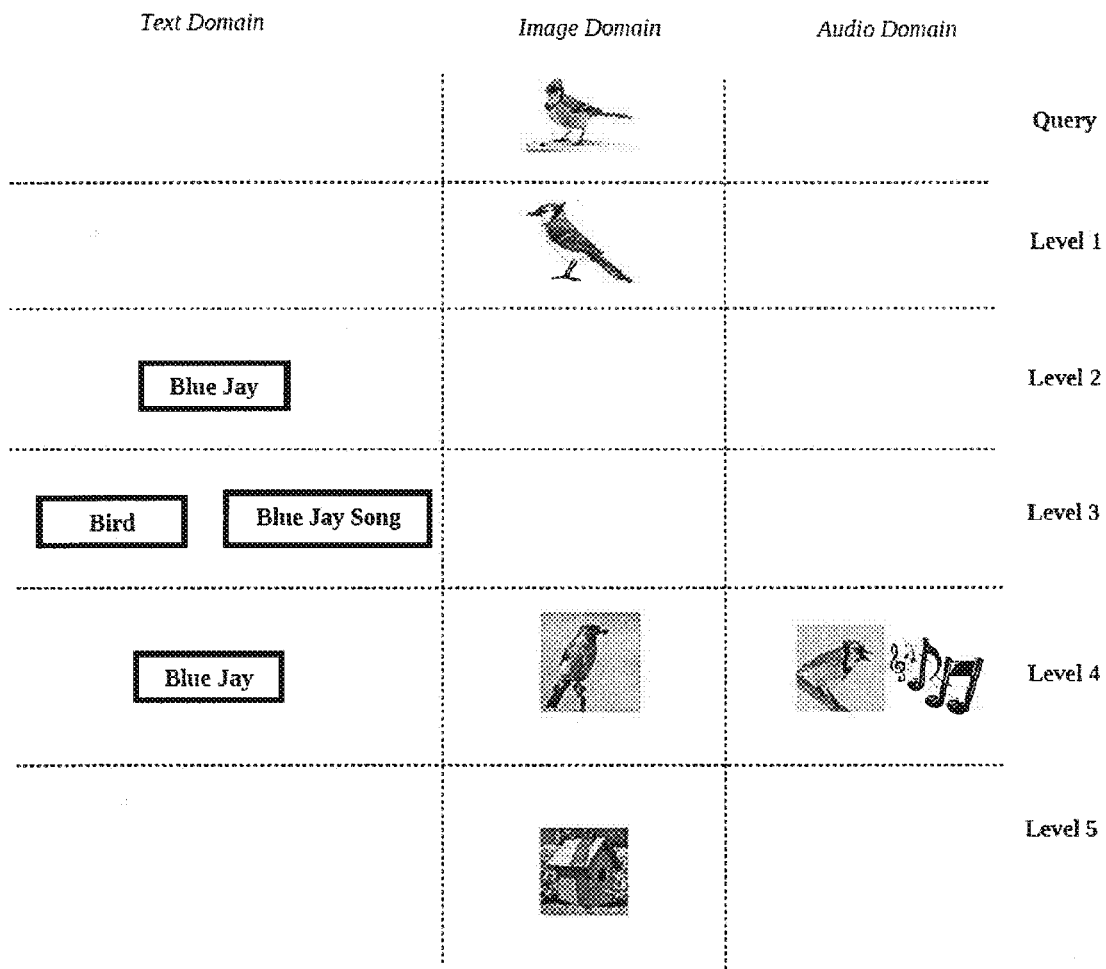
Fig. 24: The first five levels of hierarchy for the image of a Blue Jay in the search query.

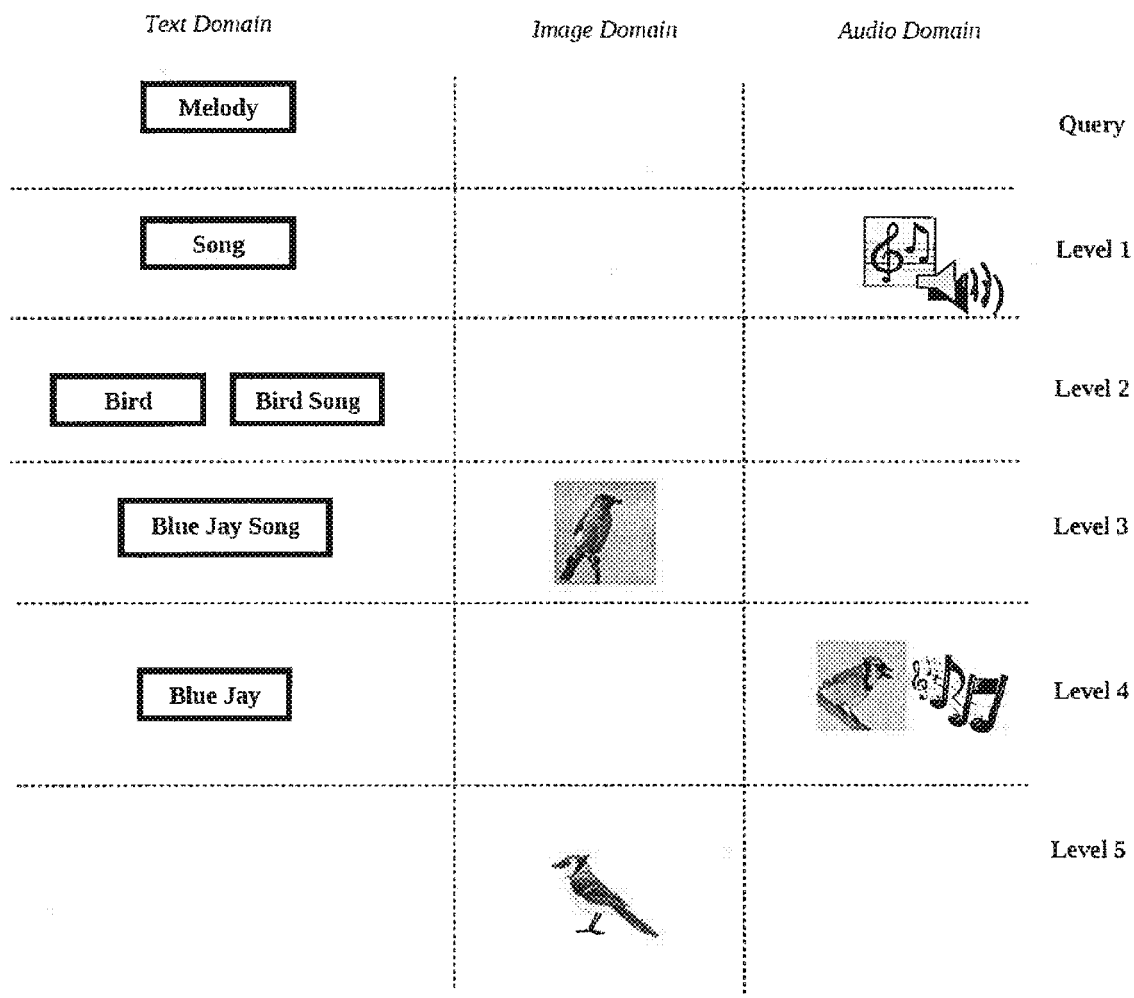
Fig. 25: The first five levels of hierarchy for the textual term "melody" in a search query.

Query  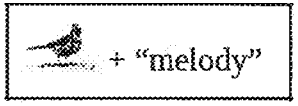
Results with Method 1:
*Textual Results*        *Image Results*        *Audio Results*
| Bird | Bird Song |
|---|---|
| Blue Jay Song | Blue Jay |
        
Fig. 26: Example of the result of intersection of the hierarchies in Fig. 24 and Fig. 25 returned as the result of a composite query.

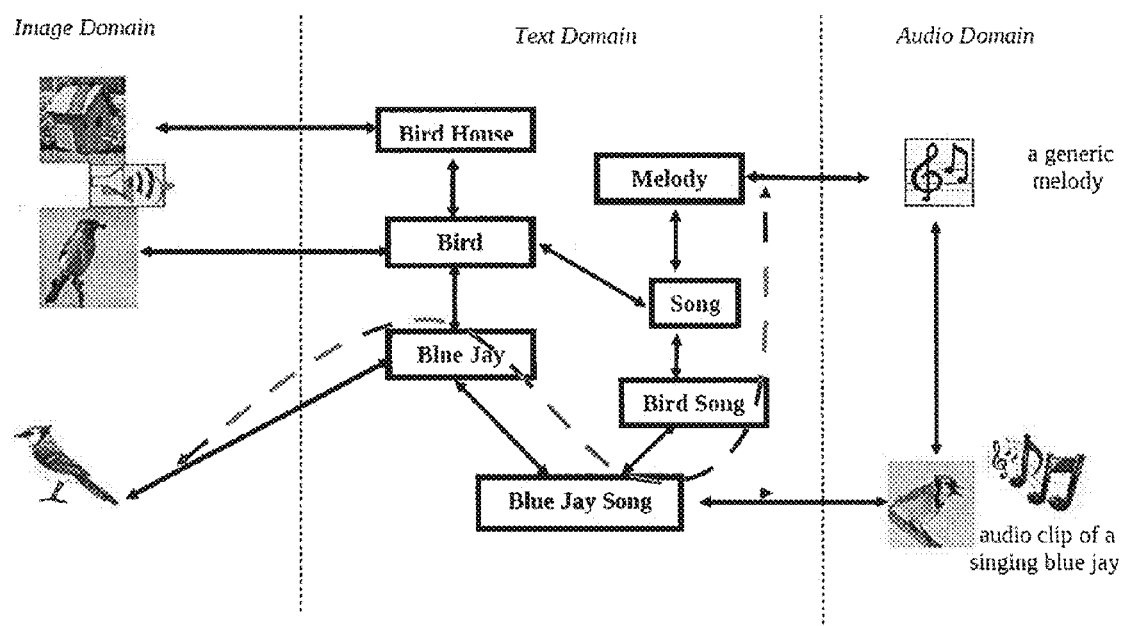
Fig. 27: The shortest path in the association graph between the image of Blue Jay and the textual term "Melody"

Query 
Results with Method 2:
Textual Results     Image Results     Audio Results
Blue Jay
Blue Jay Song
Bird Song
 Song     
Melody
Bird     
FIG. 28

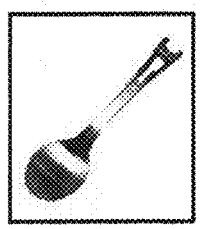 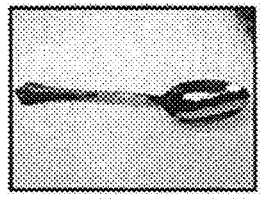 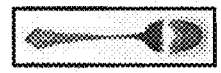
hi_titan_tool_spoon.jpg  spoon.jpg  silver-jcc-spoo...29.jpg
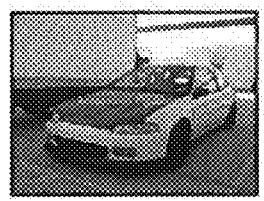 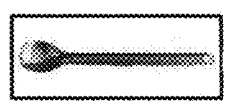 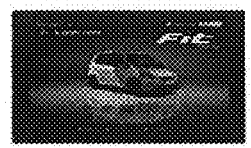
Spoon windshiel...R1.JPG  bpl_long_spoon-220.jpg  silver-jcc-spoo...29.jpg
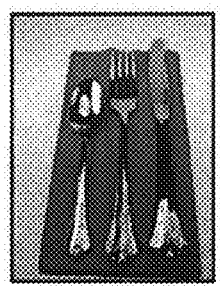  
silverware_spoo...in.jpg  felix-spoon.jpg  spoon-civic-typ...00.jpg
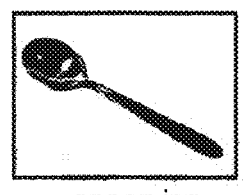 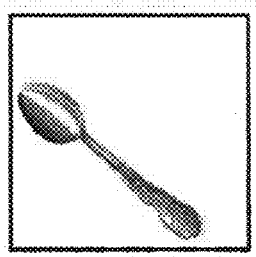 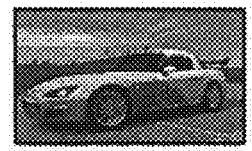
spoon.jpg  spoon.jpg  spoon1.jpg
FIG. 29A: Example of top images returned by Yahoo! Image search query "Spoon"

(a) SINGELTONS
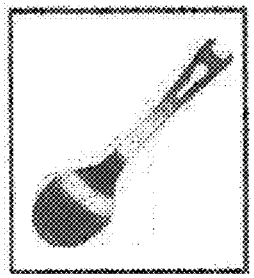
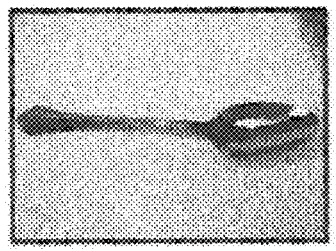
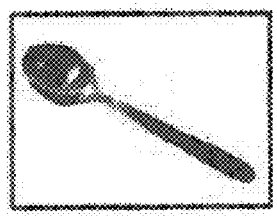
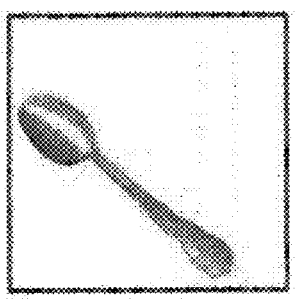
(b) COMPOSITES
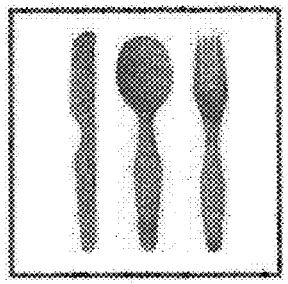
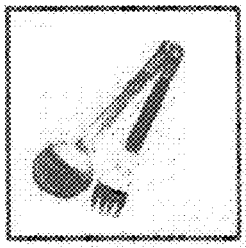
Fig. 29B: Example of top images returned by Yahoo! Image for search query "Spoon"

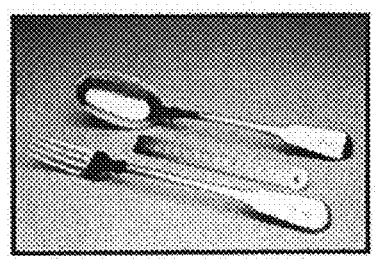
Rare Antique Si...s).Jpg
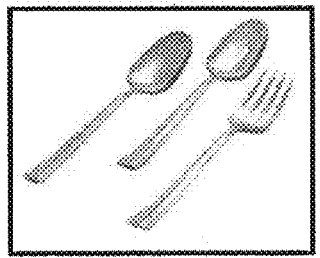
Oneida-Harmony-...-L.jpg
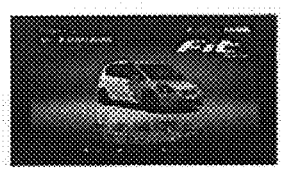
spoon-fit-03.jpg
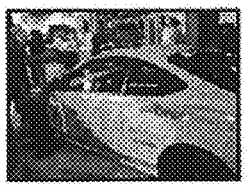
Spoon RSX 1.jpg
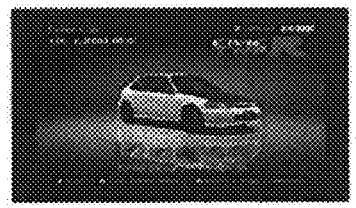
spoon-civic-typ...00.jpg
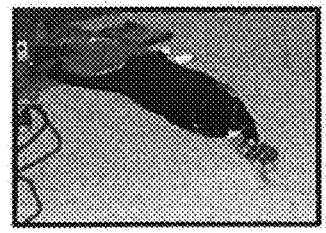
kissing_spoon.jpg
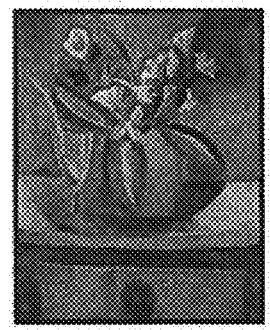
Pablo Picasso -...on.JPG
FIG. 30

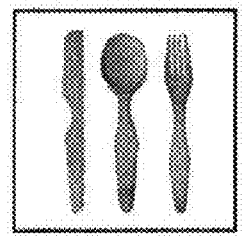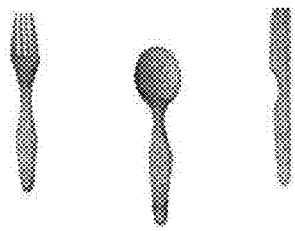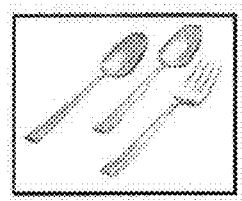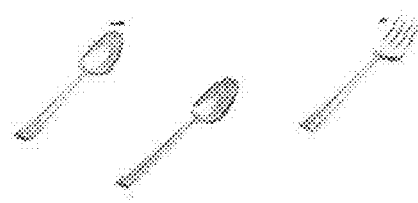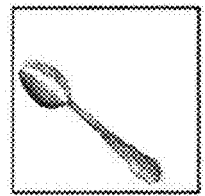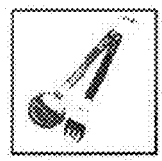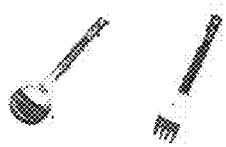
Fig. 31: Segmenting some of the images in Figure 30.

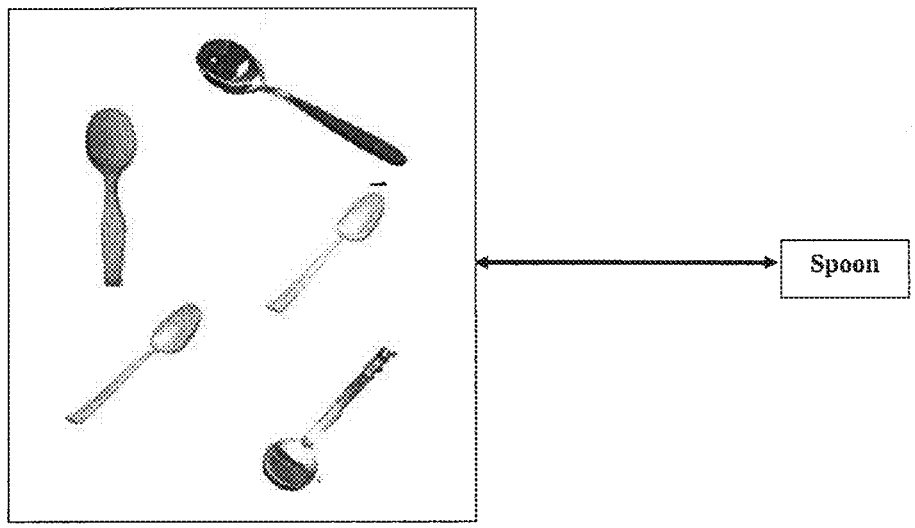
Fig. 33: An example of an entry in the "dictionary of multimedia concepts"

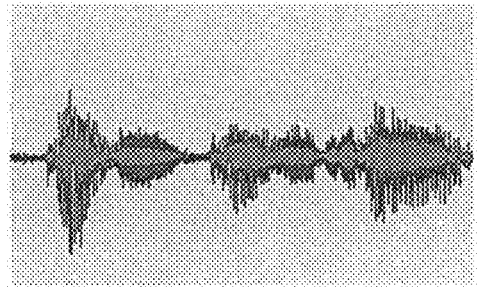
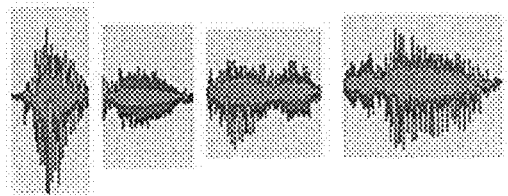
With the introduction of Nintendo ...
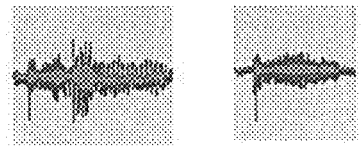
Nintendo started to capture ...
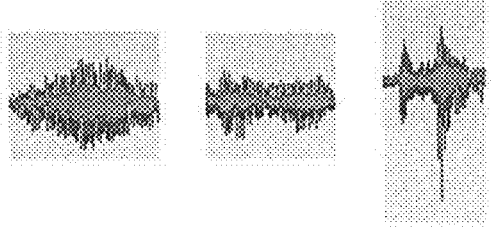
... everything in Nintendo ...
Fig. 34: (left) audio signals that contain the work Nintendo in their subtitle or closed caption, (right) segmentation of these audio signals into likely constituent words.

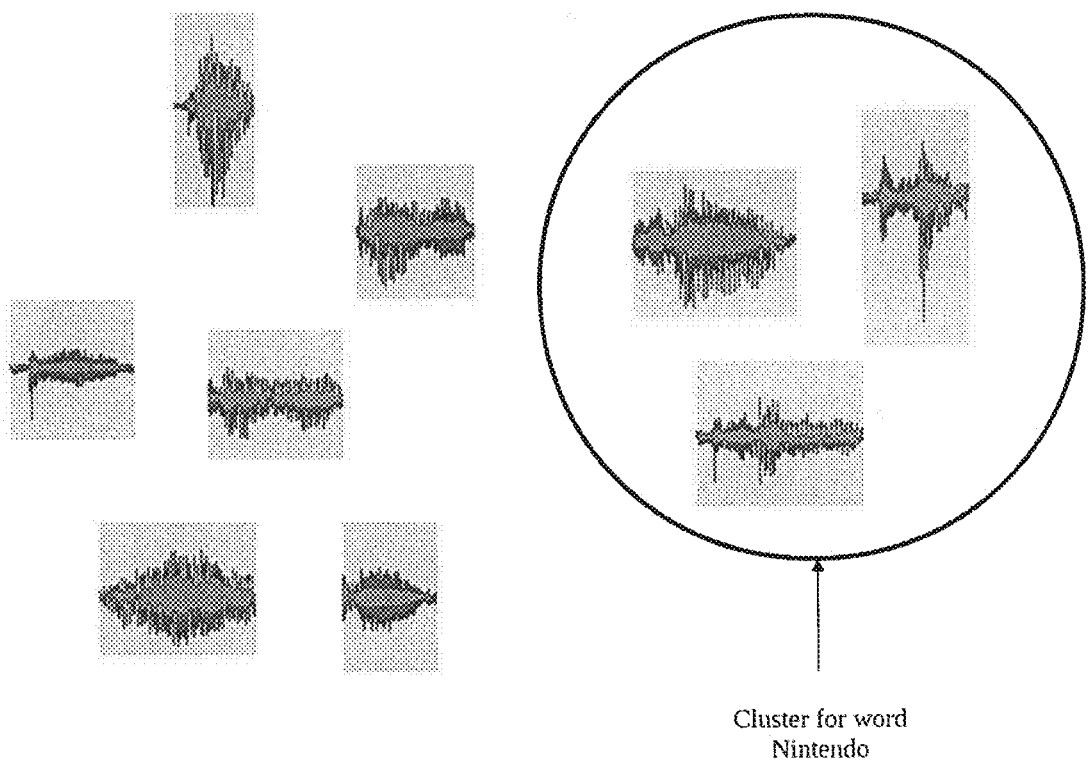
Fig. 35: Clustering the likely word segments in Figure 34 to detect the cluster that most likely represents the word "Nintendo".

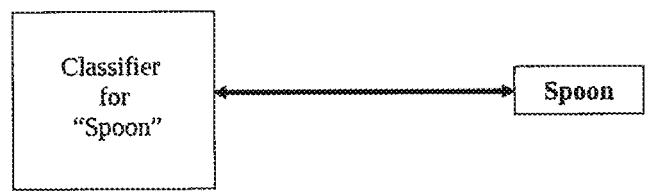
Fig. 36: Representation of a relationship in the database of classifiers.
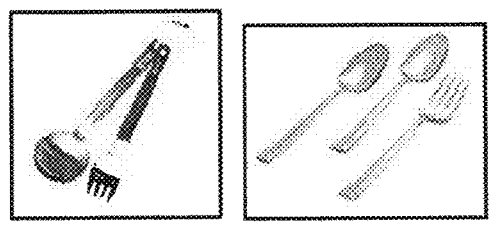
Fig. 37: An example of Co-occurrence of "spoon" and "fork"

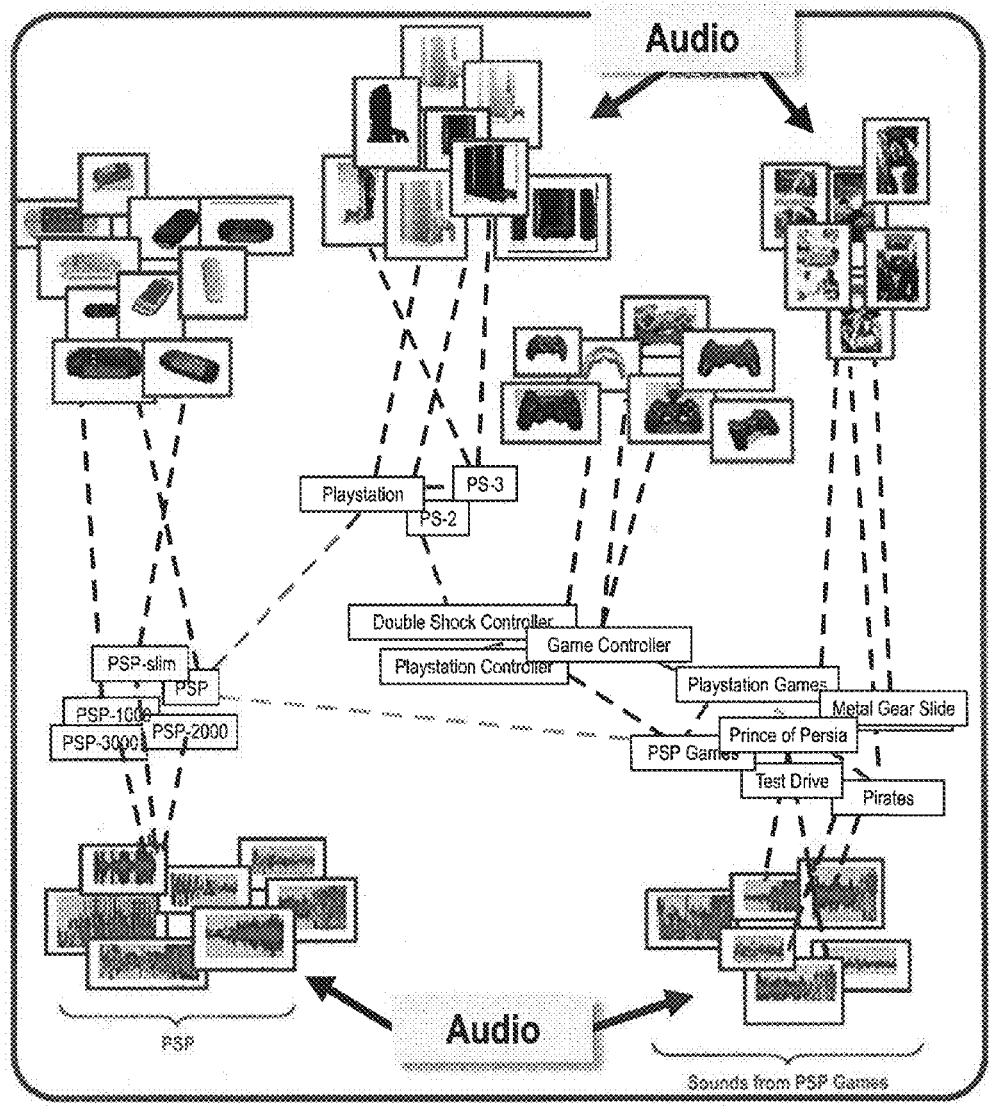
FIG. 38: A part of the Multimedia Brain around context "PSP 3000"

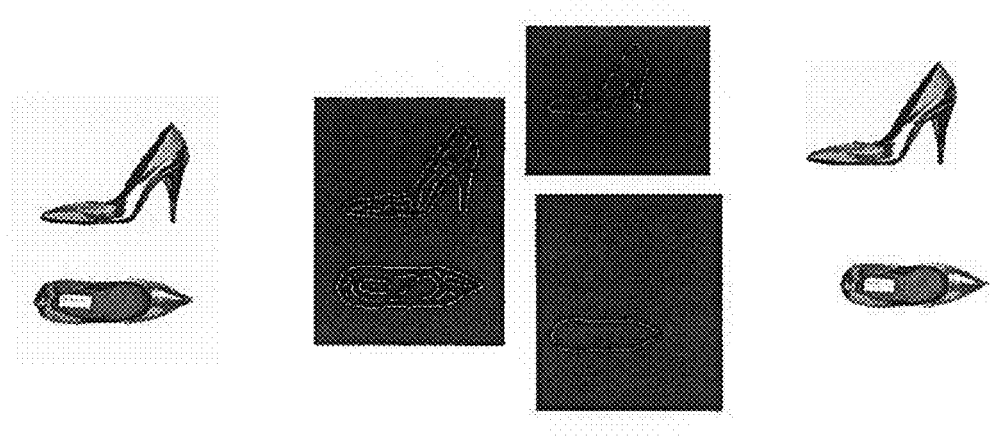
Figure 39: Shapes based segmentation of a pair of shoes
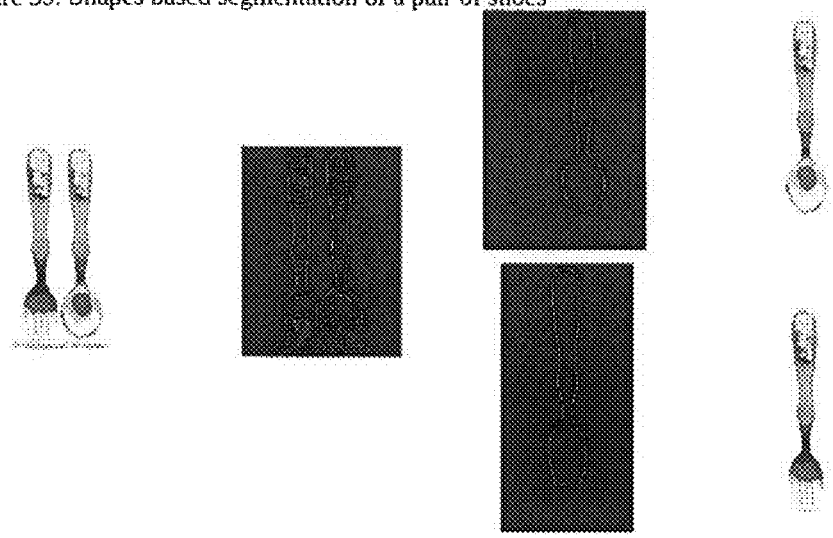
Figure 40: Shapes based segmentation of a composite images of spoon and fork

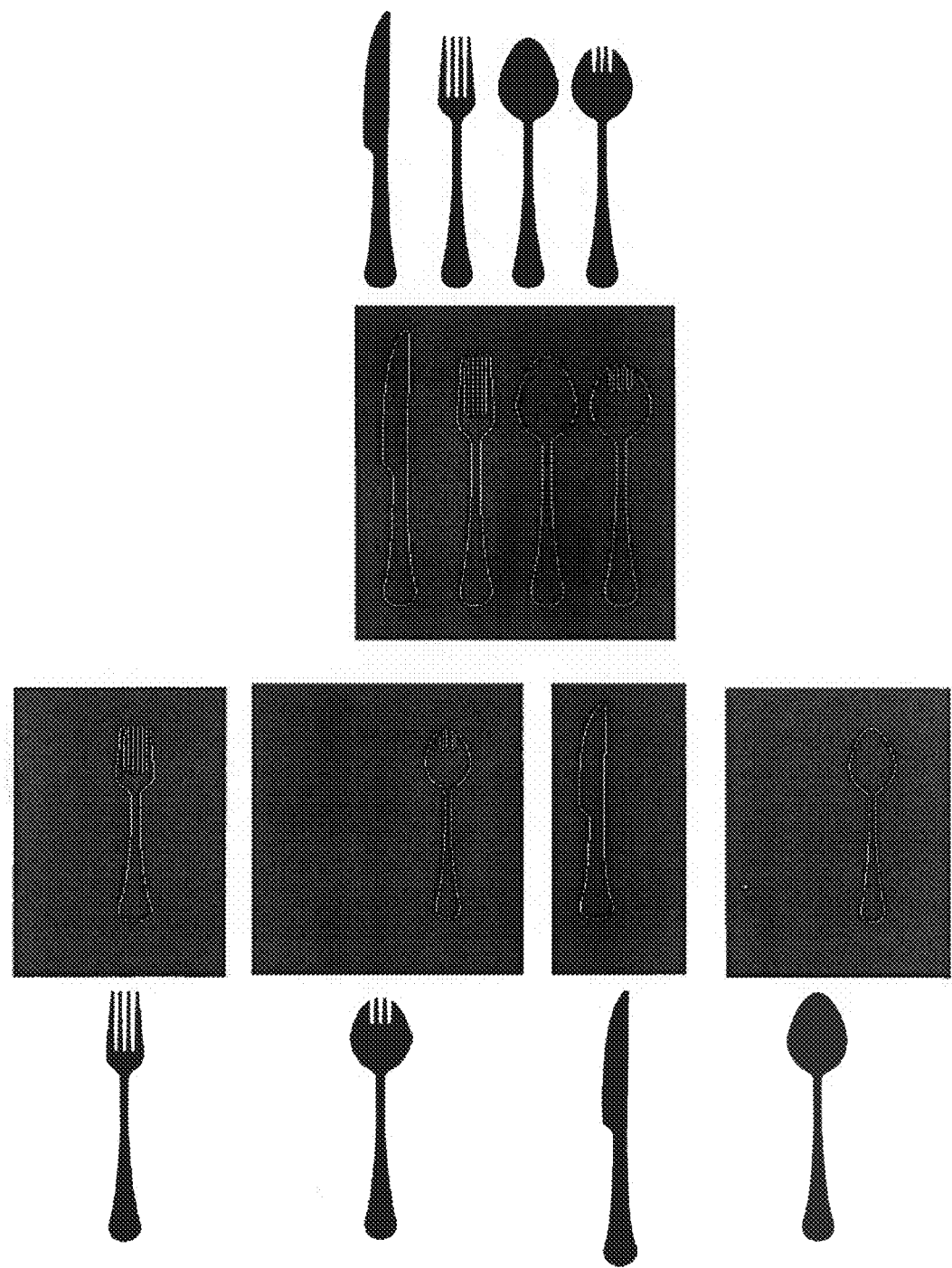
Figure 41: Shapes based segmentation of a composite images of spoon set

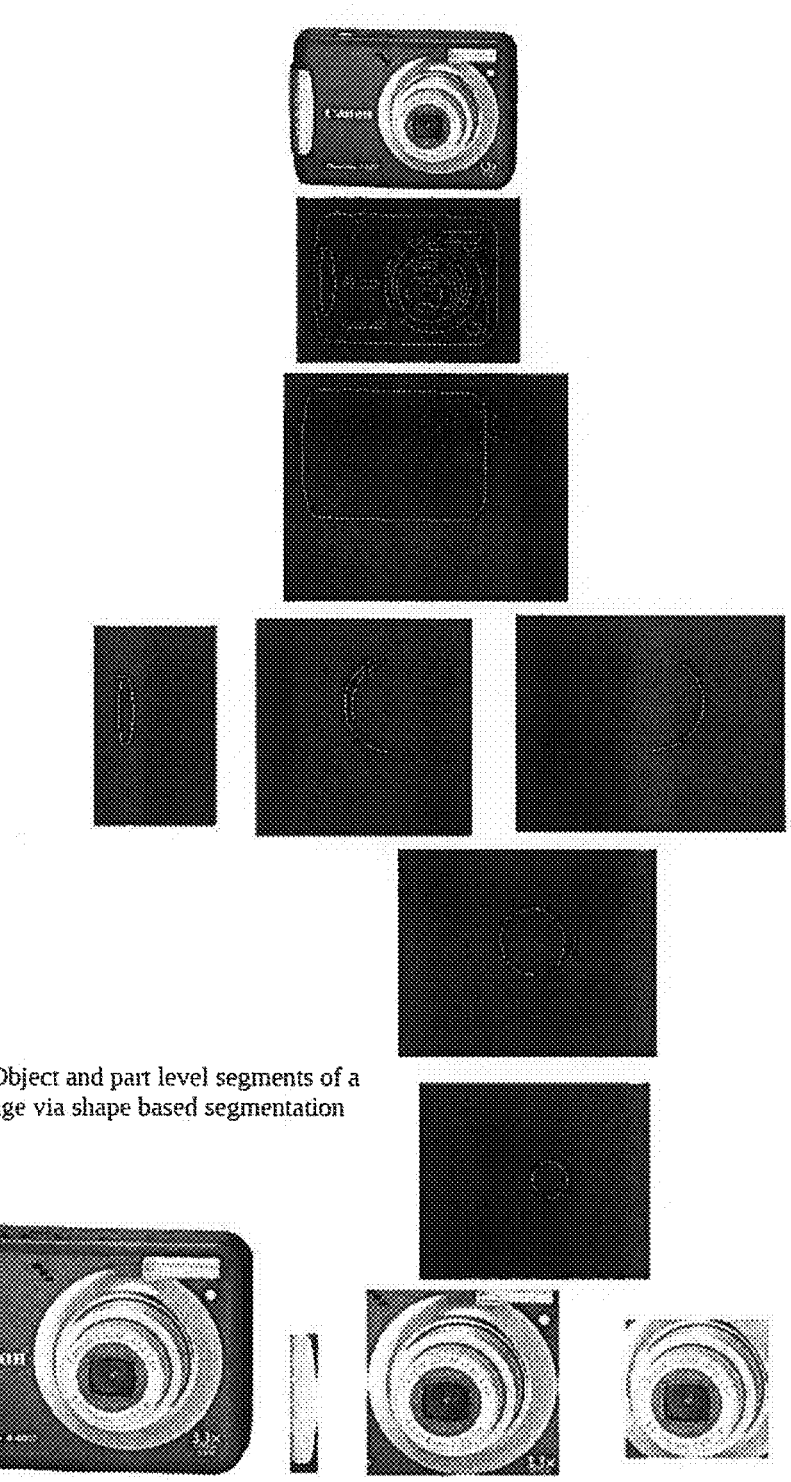
Figure 42: Object and part level segments of a Camera image via shape based segmentation

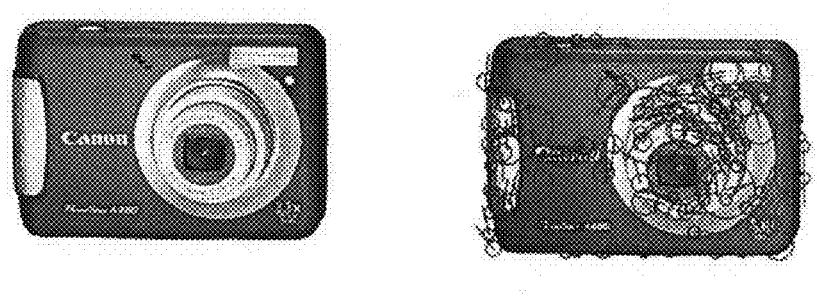
Figure 43: Local Interest Point based Segmentation for a camera image
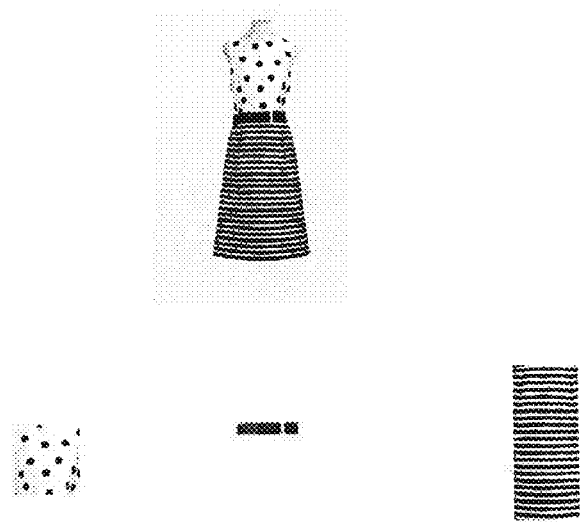
Figure 44: Color based segmentation of a dress

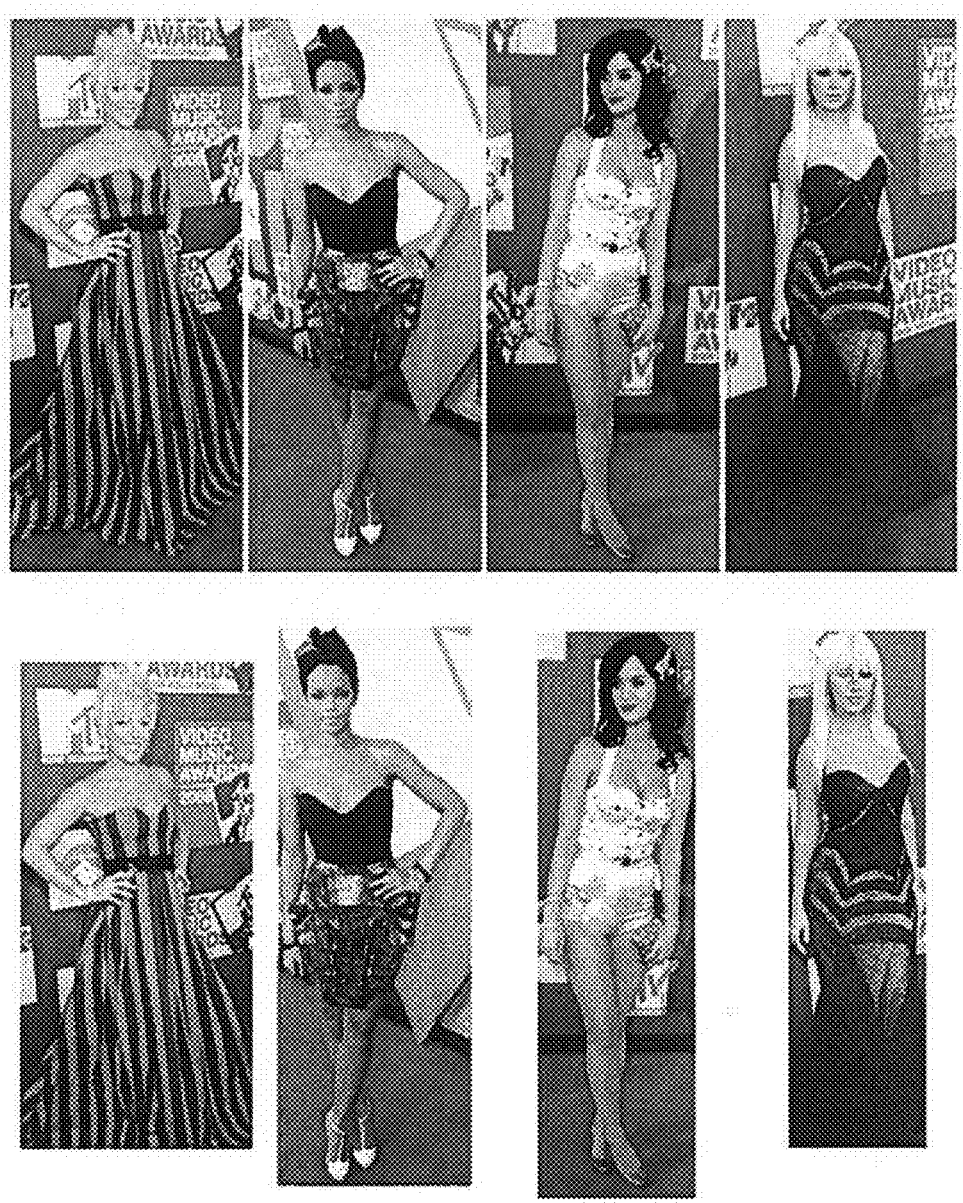
Figure 45: Face detection/human detection based segmentation

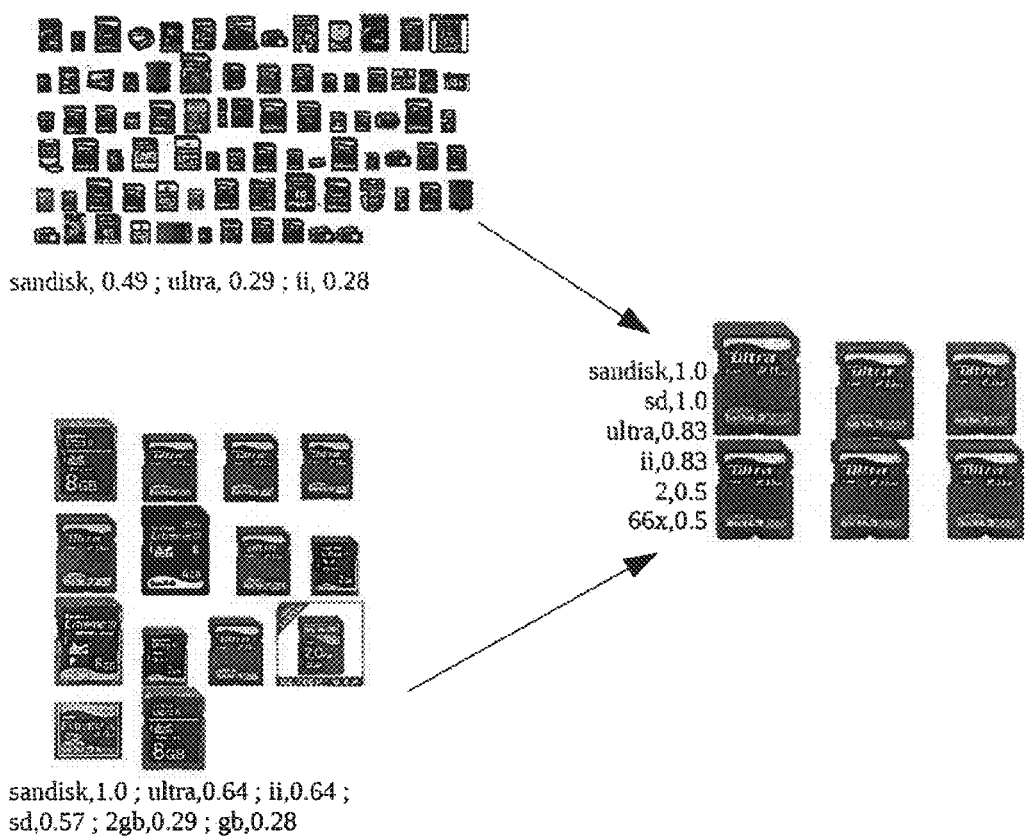
Figure 46: an example of hierarchy of visual-textual similarity clusters

SYSTEMS AND METHODS FOR BUILDING A UNIVERSAL MULTIMEDIA LEARNER

CROSS-REFERENCE TO RELATED APPLICATIONS

This application is a continuation of allowed U.S. patent application Ser. No. 13/091,459 filed Apr. 21, 2011, which claims benefit of and priority to U.S. provisional application Ser. No. 61/342,856 entitled "Methods and Systems for Extraction and Mining of Multi-Domain Data" filed Apr. 21, 2010 and U.S. provisional application Ser. No. 61/342,855 entitled "Methods and Systems for Unsupervised Learning" filed Apr. 21, 2010 and both incorporated here by reference.

FIELD

The disclosure relates to a system and methods for building a universal multimedia learner.

BACKGROUND

Most physical and psychological concepts are associated with multiple attributes that are often in different domains. Coffee, for instance, is associated with a multitude of physical attributes, each involving a different set of our senses, such as color, smell, taste and temperature, as well as psychological attributes, such as joy. The human brain learns and creates the concept of "coffee" by correlating and associating all these attributes together. The more of these attributes that are present, the stronger the sense of "coffee" will be in our brain. Also, the brain allows us to tunnel between different domain perceptions associated with one concept; the smell of coffee, for instance, may create the perception of "joy," before we even drink the cup. Such correlations cannot be explained unless one has knowledge of the concept of "coffee" through which this distinctive smell is linked to the joyous feeling.

The same idea applies to the domain of multimedia signals, where objects and concepts are usually associated with multiple attributes in text, audio and image domains. The word "laugh" is associated with several representations: a smiley face, white teeth, sound of laughter and the concept of "happiness." Search for the keyword "Laughing" on Yahoo! Images returns the images in FIG. 18. But "laughter" and "laughing" are associated with a host of other concepts. Searching for "Happy" returns the images in FIG. 21. Clearly, there is a strong correlation between the visual contents of the two sets of images, as well as between the keywords describing them. However, the images and the text lie in two different signal domains.

In the above example, there are two domains (text and image domains) and three types of relationships: (1) between two attributes in the text domain or, (2) between two attributes in image domain or, (3) cross domain relationships between attributes in image and text domains. We know that the two phrases "Laughing" and "Happiness" are conceptually related. This relationship can be discovered using, say, a lexicographic dictionary such as WordNet, a tool specific for the text domain. The image domain relationships can be discovered using an image correlation method. Thus, the intra-domain correlations can be discovered using domain-specific analysis tools. The inter-domain relationships, however, have to be learned by examples. After all, one cannot compare apples and oranges. Also, new intra-domain relationships may emerge based on inter-domain relationships. For example, the intra-domain relationship between an image of a birdhouse and an image of a Blue Jay is established via text-to-image cross-domain relationships (the blue dotted line in FIG. 23). However, to be able to learn a myriad of such cross-domain relationships that exist across multimedia signals, one needs a really huge set of examples.

Further, a related and longstanding goal in artificial intelligence (AI) is to enable content-based, automated querying of multimedia signals, such as object recognition in images and video, or speaker independent speech recognition. Once again, a major obstacle in attaining this goal is the lack of sufficient number of training examples to train AI classifiers. For certain classes of tasks, such datasets of examples have been collected manually. Examples include databases for face detection, pedestrian detection, or the like. This method, however, does not scale to the "Internet scale." The state-of-the-art classifiers require thousands of positive examples that need to be carefully segmented. Manual collection of thousands of training images for each of the nearly 10,000 common objects is prohibitive. The same limitations apply to speaker-independent speech recognition, where one requires examples of the pronunciations of each word in the dictionary by hundreds of speakers.

The required training data and cross-domain examples, however, is available in raw form on the Web or other unstructured datasets, such as movie archives. The Web now contains millions of freely available audio and video clips and images. These abundant examples, however, are at best loosely annotated by textual descriptions. These loose annotations have been used to enable multimedia searches in the Web that work to some extent (e.g. the above mentioned Yahoo! Images search engine). For instance, to locate an image corresponding to an object X, those images that are annotated with the metadata X are returned. Examples include those images whose URLs contain the term X (e.g., X.jpg) or whose captions contain the term X. In our above example of "laugh" concept, Yahoo! Images provides us with the required examples. FIG. 22 shows the collection of images downloaded from Yahoo! Images, Set 1 corresponding to "Happy" and Set 2 corresponding to "Laughing" with the left side of the Figure showing the text phrases and the right side showing images. Internet users have tagged the images in "Set 1" with the term "Happy," while the ones in Set 2 have been tagged with "Laughing." This tagging is usually implicit, for instance, the name of the image file may by happ_kid.jpg or the text most probably describing the image may contain the phrase "happy."

Similarly, the first 12 results from Yahoo! Images when searching for the term "Spoon" are shown in FIGS. 29A and 29B. Note that all these images contain the term "spoon" in the name of the file. Clearly, a good fraction of these images indeed contain the object "spoon." However, still a good fraction of the images do not contain any image of an actual spoon. Another fraction of images contain a "spoon" at an unknown location, along with other objects. Even though each and every individual image in this collection cannot be trusted to be a spoon, the likelihood of finding a spoon is significantly larger than in a random collection of images. This disproportionate presence can be detected by an appropriate method to establish what constitutes to the image of a "spoon" without the need for manual intervention.

Thus, the abundance of loosely annotated data along with innovative domain-specific tools can indeed be harnessed to establish intra-domain as well as cross-domain relationships and ultimately to understand the multimedia entities. It is an object of this disclosure to provide a unified framework for this purpose as well as to present a method and system to achieve this goal.

SUMMARY

This disclosure relates, generally, to the problem of discovering and managing multimedia entities from loosely annotated sets of multimedia signals, such as those found on the Web or movie archives. Multimedia signals reside in a space where objects and concepts are usually associated with multiple attributes in text, audio and image domains. Therefore, to understand a multimedia entity, one needs to understand these cross-domain signals, and the relationships among them, in single-domain as well as across different domains. A major obstacle in achieving this goal has been the lack of sufficient number of training examples to train appropriate classifiers. The required training data, however, is available in raw form on the Web or other unstructured datasets, such as movie archives, albeit at the best loosely annotated by textual descriptions.

This disclosure presents a method and system (called "Universal Learner") for building a multimedia association graph called "Multimedia Brain (MMB)" from a huge set of loosely annotated multimedia. The MMB comprises visual signals, audio signals, and text phrases that capture a multitude of objects, experiences and their attributes, and the links among them that capture similar intent or functional and contextual relationships. The process of building the MMB comprises performing segmentation, clustering, and classification and co-occurrence analysis in a plurality of signal domains. In preferred embodiments of the disclosure, the MMB can be used for a variety of applications, including but not limited to, signal similarity search, signal classification, including object detection, to perform composite (i.e., cross-domain) queries (for instance, a query with a text term and an image), to match multimedia signals to advertisement signals, to build multimedia recommendation systems for ecommerce, and to provide an intent or context summary of any document comprising of any combination of multimedia signals.

BRIEF DESCRIPTION OF FIGURES

FIG. 1 illustrates a process of building the Multimedia Brain.

FIG. 2 illustrates an exemplary module for metadata extraction.

FIG. 3 illustrates an exemplary module for building a Seed Query Bank and a Metadata based Multimedia Search Engine.

FIG. 4 illustrates an exemplary algorithm for image segmentation.

FIG. 5 illustrates an exemplary visual clustering module.

FIG. 6 illustrates an exemplary visual clustering module augmented by textual knowledge.

FIG. 7 illustrates an exemplary visual classification module.

FIG. 8 illustrates an exemplary module for unified visual classification.

FIG. 9 illustrates an exemplary audio segmentation module.

FIG. 10 illustrates an exemplary audio clustering module.

FIG. 11 illustrates an exemplary audio clustering module augmented by textual knowledge.

FIG. 12 illustrates an exemplary audio classification module.

FIG. 13 illustrates an exemplary module for unified aural classification.

FIG. 14 illustrates an exemplary video segmentation module.

FIG. 15 illustrates an exemplary video clustering module.

FIG. 16 illustrates an exemplary module for unified video classification.

FIG. 17 illustrates the steps in co-occurrence analysis.

FIG. 18 illustrates examples of performing multi-attribute searches in which query terms may come from different domains.

FIG. 19 illustrates a process of serving relevant ads to users based on their multimedia clip of interest.

FIG. 20 illustrates examples of images returned by Yahoo! Images search engine for the query "laughter."

FIG. 21 illustrates examples of images returned by Yahoo! Images for the query "happy."

FIG. 22 illustrates two collections of images downloaded from Yahoo! Images, Set 1 corresponding to "Happy," and Set 2 corresponding to the term "Laughing."

FIG. 24 illustrates the first five levels of hierarchy for the image of a Blue Jay in the search query.

FIG. 25 illustrates the first five levels of hierarchy for the textual term "melody" in a search query.

FIG. 26 illustrates an example of the result of intersection of the hierarchies in FIG. 24 and FIG. 25 returned as the result of a composite query.

FIG. 27 illustrates the shortest path in the association graph between the image of a Blue Jay and the textual term "Melody."

FIG. 28 illustrates the attributes in different domains that are within one hop of the shortest path between the image of a Blue Jay and the term "Melody" as in FIG. 27 are returned as the result of the composite query.

FIGS. 29A and 29B illustrate an example of top images returned by Yahoo! Images for the search query "Spoon."

FIG. 30 illustrates the three possible types of images related to the query "spoon": (a) singletons in which the spoon is shown alone, (b) composites in which the spoon is shown with other objects and (c) negatives in which there is no visible spoon.

FIG. 31 illustrates segmentation of some of the images in FIG. 30.

FIG. 33 illustrates an example of an entry in the "dictionary of multimedia concepts."

FIG. 34 illustrates audio signals that contain the word Nintendo in their subtitle or closed caption (left) and segmentation of these audio signals into likely constituent words (right).

FIG. 35 illustrates clustering of the likely word segments in FIG. 32 to detect the cluster that most likely represents the word "Nintendo."

FIG. 36 depicts a representation of a relationship in the database of classifiers.

FIG. 37 illustrates an example of the co-occurrence of "spoon" and "fork."

FIG. 38 illustrates a part of the MMB around context "PSP 3000."

FIG. 39 illustrates an exemplary shape-based segmentation of a pair of shoes.

FIG. 40 illustrates an exemplary shape-based segmentation of a composite image containing a spoon and a fork.

FIG. 41 illustrates an exemplary shape-based segmentation of a composite image of a spoon set.

FIG. 42 illustrates an exemplary shape-based segmentation of a camera image to obtain object and part level segments.

FIG. 43 illustrates an exemplary local interest point-based segmentation of a camera image.

FIG. 44 illustrates an exemplary color-based segmentation of a dress.

FIG. 45 illustrates exemplary face/human detection-based segmentation.

FIG. 46 illustrates an exemplary hierarchy of visual-textual similarity clusters computed as per module of FIG. 6.

DETAILED DESCRIPTION

As used herein, the term "Multimedia Brain" or "MMB" is defined as an association graph, which illustrates and defines the intent, functional and contextual relationships between objects, experiences and the attributes of the objects and experiences, such as but not limited to, visual signals, audio signals, text phrases and the like through one or more nodes. The one or more nodes in the association graph are object level, attribute level or feature level signals in one or more domains, and links between two nodes represent some relationship in terms of functionality, context, intent and the like. A part of the MMB around context "PSP 3000" is shown in FIG. 38. The building of the MMB and some of the applications of the MMB is described in the following preferred embodiment.

Figure 23:
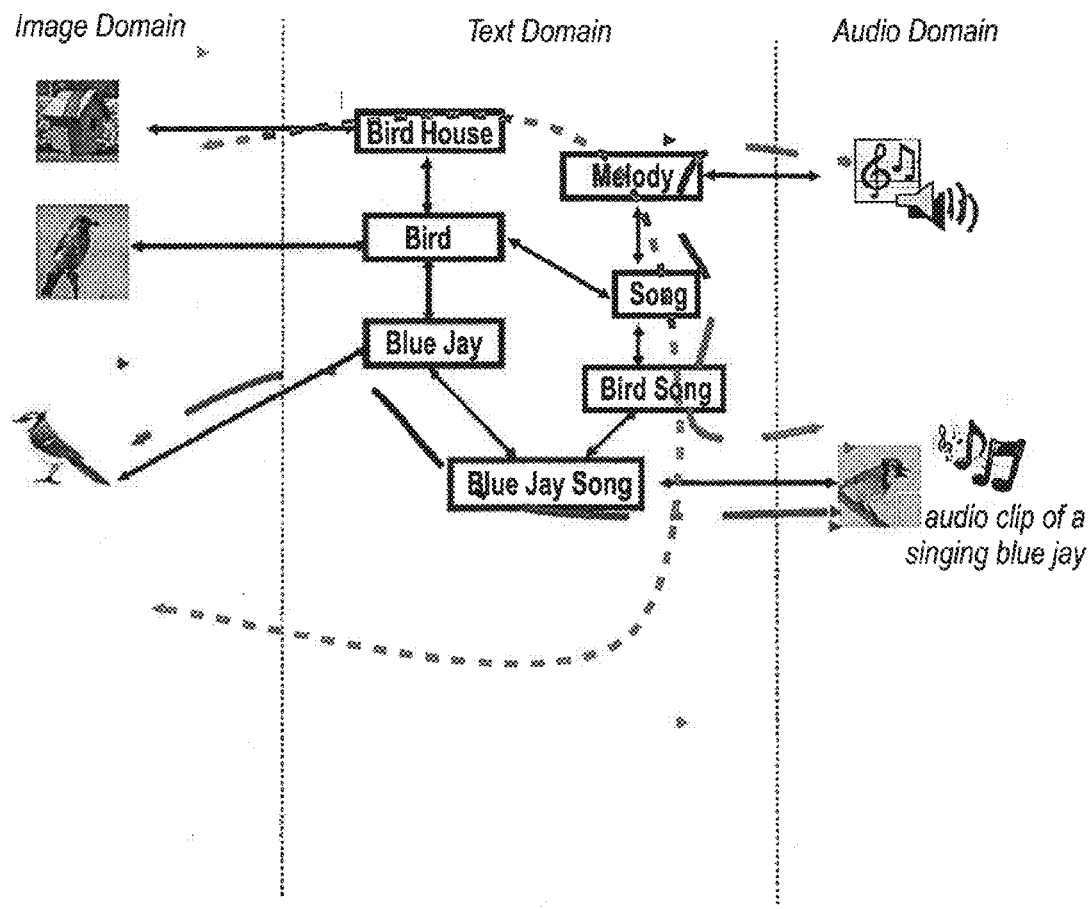
FIG. 23 illustrates an example of a cross-domain association graph with text, audio and image descriptors.

It should be noted that the MMB can be used to discover even implicit relationships between attributes within a domain or between domains. Three examples of such inferences are shown in FIG. 23:

FIG. 23 is an example of a cross domain association graph with text, audio and image descriptors. The direct connections are established between attributes in one domain or across domains to create a graph. The path can be discovered in this graph from attributes in different domains (the dotted paths). In FIG. 23, the blue dotted path shows how the image of a "Blue Jay" is related to the image of a "Bird House." While the two images are not correlated in the visual domain, there are strong correlations between them through the "text" domain. The image of the "Blue Jay" is related to the word "Blue Jay," which is related to the word "Bird," which is also related to the word "Bird House." Thus, the two images of a Bird House and Blue Jay are correlated through a chain of textual descriptions:

the image of a Blue Jay←→"Blue Jay"←→Bird "Bird←→House"←→the image of a Bird House This correlation could not have been discovered by analysing the image domain information alone. In the second example shown in FIG. 23 with the green dashed path, an audio clip that plays back a generic "Melody" is associated with an audio clip of a "Singing Blue Jay."

The red dash-dotted path in FIG. 23 shows a cross-domain correlation between the image of a "Blue Jay" and an audio clip of a blue jay singing. This correlation is made through the texts Blue Jay Blue Jay Song. This type of association cannot be made by analysing signals in the Image and Audio domains alone.

The system and method of the present disclosure is referred to as the "Universal Learner" or "UL." The "Universal Learner," as used herein, is a method or system that provides a unified framework to understand multimedia signals by utilizing loosely annotated multimedia data on the Web and analyzing it in various signal domains such as text, image, audio and combinations thereof, while building the Multimedia Brain. The universal learner is depicted in FIG. 1.

FIG. 1 shows that each document from the collection of loosely annotated large scale multimedia data 102 is processed by a noisy metadata extraction module 104, which extracts signals in various domains (text, image, audio, video) from the document and aggregate textual information around each non-textual signal to assign a textual metadata to it. A standard text-based multimedia search engine 108 is then built on top of the metadata extracted by 104 and by utilizing the link structure among the documents (e.g., the hyperlinks in Web pages). Querying a text phrase to the metadata (text)-based multimedia search engine 108 returns a certain number of top multimedia signals, in one or more domains as requested, ranked by the relevance of their metadata to the query text phrase. Further, a representative set of text phrases, the seed textual query bank 106, is also computed based on the set of metadata extracted by the metadata extraction module 104, frequency analysis, and the importance of the documents they come from (e.g., PageRank in the case of Web documents).

The seed textual query bank 106 and metadata (text)-based multimedia search engine 108 are built largely to efficiently perform the later steps in the UL. For example, when hundreds of billions of Web documents and over billions of images are analysed, analyzing each pair of signals for similarity will be a computationally formidable task even in a cloud computing environment unless there exists a way of pruning most of the unrelated and may be sometimes very weakly related signals.

For each text phrase in seed textual query bank 106, the metadata based-multimedia search engine 108 is queried in each domain or a combination of domains, and only a certain top number of results (say 1,000) returned by metadata (text)-based multimedia search engine 108 are analyzed in the following steps. The domain-specific segmentation module 110 analyzes the signals and segments them into object level, attribute level and feature level segments in the respective signal domains. These segments are then sent to clustering module 112, where similar signals, as indicated by a signal similarity/distance measure, are clubbed together to make clusters. For example, in the case of images, these clusters may represent visual similarity, as indicated by presence of a given object, or similar looking in shape, similar looking in color, or containing a particular face or human body and the like. Each such cluster is thus said to correspond to an object, attribute, or a feature. A multimedia attribute dictionary 116 is built where entries correspond to the above discovered clusters. Each cluster might also be given a textual name by aggregating the metadata of the signals in that cluster, as previously computed by the metadata extraction module 104, and may further be merged with another cluster if their metadata are similar enough. Some clusters might also be thrown away if they don't have enough number of members even after merging.

Finally, each cluster can be considered as a class. Using classification module 114, a classifier can be built for each such class using supervised learning techniques (e.g., Support Vector Machines (SVM)) where members of the class are used as positive examples, and a random sample from other clusters are used as negative examples. This gives us a dictionary of classifiers 118 where entries are the classifiers for above classes. Instead of a dictionary, there might be a unified classification scheme for all the classes as well. Note that clustering module 112 may use a set of different signal similarity measures together to discover similar clusters and not necessarily a particular one. For example, a cluster may contain images of products that are similar by shape, whereas another cluster may contain images of dresses that are "approximately" similar in color, pattern and the like. Each cluster discovered by clustering module 112 makes up a node in the Multimedia Brain.

Each document in the loosely annotated large scale multimedia data 102 is again analyzed via the metadata extraction module 104, the seed textual query bank 106, the metadata-based multimedia search engine 108 and the domain-specific segmentation algorithm 110 and sent to co-occurrence analysis engine 120. If two signals, in one domain or in different domains, corresponding to two nodes in MMB appear in the same document, they are said to co-occur, and a weighted link in MMB is created between the two nodes. The weight of the link is computed using the statistics of the nodes, how often they co-occur, as well as the importance of the documents they co-occur in, and the statistics computed across all the analyzed documents and signals. This weight essentially represents the strength of the relationship between the two nodes. Thus, analyzing the collection of signals allows one to extract relationships representing the links in the MMB. For example, consider the composite images resulted from searching for the object "spoon" (ref. FIG. 30(b)). Many of these composite images also contain images of "forks." The reason is that the two objects, "spoon" and "fork," are conceptually related; i.e., they are often used together. Such high-level association cannot be directly discovered by analyzing example images of spoons and forks separately. Rather, it follows from detecting the frequent occurrence of these two objects in composite images. If one is able to detect the presence of each object in images, then the two nodes in MMB representing the two objects are connected if their corresponding attributes have been detected close to each other in a signal. Oftentimes, the more these attributes co-occur, the stronger this relationship will be.

Depending on the definition of a node (a signal segment, an object, a feature represented by a quantized vector and the like), the definition of a document, and definition of co-occurrence, there are a multitude of relationships that are computed to be a part of the MMB. In the above description in the case of just visual signals, the notion of co-occurrence was defined based on spatial proximity. For example, signals such as audio and video have temporal correlations in them. The proximity, therefore, may be defined in such a way as to encompass the notion of spatial and temporal proximity. In an audio signal, for instance, the words that are pronounced successively must be correlated. In video frames, a combination of spatial and temporal proximity of objects detected across frames may be used as an indication of their correlation. In this case, the weight is a function of the proximity of the segments that co-occurred in the signal. As an example, suppose the audio signal for the sentence, "There are many new Nintendo games in the market," is analyzed when creating the MMB using a dictionary of classifiers that is able to detect the words "Nintendo," "games" and "market." Then, the weight of the link between two nodes corresponding to "Nintendo" and "games" may be increased more than the increase in the weight between the nodes corresponding to "Nintendo" and "market" because the two words "Nintendo" and "games" appeared closer to each other in the sentence, compared to "Nintendo" and "market."

The (noisy) metadata extract module 104 is depicted in FIG. 1 and FIG. 2. FIG. 2 depicts a flowchart for the (noisy) metadata extraction module. Each Web document is analyzed by this module, and a set of signals present in the document along with a textual description for each of them is computed. In step 204, the document 202 is processed, and signals in various domains—text, visual, audio, and video—are extracted along with their relative positions in the document. For each of the non-textual signals (e.g., an image), step 206 extracts its URL, title and the text around it including the caption, and this textual information is aggregated in step 208 to create a combined textual description for the signal and is assigned to the signal as its metadata. If the signal appears more than once in the same document or two different documents as detected in step 210 by its unique URL, all the metadata computed across those documents is aggregated again in step 212 to compute a consolidated metadata for the signal, wherein frequency of the individual metadata as well as the importance of those documents (as measured by their PageRanks) are used in computing the consolidated metadata for the signal. At the end, the pair of signals and its metadata are outputted for all the signals.

The domain-specific indexing module in FIG. 3 essentially contains three important elements: the metadata extraction module described in FIG. 2, the seed textual query bank 106, and the metadata (text)-based multimedia search engine 108. The seed textual query bank 106 and the metadata (text)-based multimedia search engine are primarily used for computational efficiency purposes. In some instances, for example, it may be easier to index images and videos based on some visual features; then seed textual query bank 106 and the metadata (text)-based multimedia search engine 108 could be replaced by a visual search engine. However, indexing textual metadata is easier than other signal domains, so in most instances, seed textual query bank 106 and the metadata (text)-based multimedia search engine 108 are utilized.

FIG. 3 depicts a flowchart for the domain-specific indexing module. In step 304, each document in collection of Web documents 302 is processed by the metadata extraction module of FIG. 2, and metadata for each signal in each document is computed. Using the metadata, step 306 creates an inverted index of multimedia signals, from text terms to the multimedia signals and the documents. This inverted index is used by 308 to compute a representative set of text phrases by analysing the statistics of the text phrases coming from metadata, as well as by utilizing the importance of the Web documents (e.g., PageRank) from which the metadata originated. This representative set of text phrases constitute the seed textual query bank 106. In step 310, a standard textual search engine 108 is built on top of this inverted index (by say PageRank analysis and TF-IDF methods) for searching multimedia signals based on their metadata. Querying a text phrase to 108 returns a certain number of top multimedia signals, in one or more signal domains as requested, ranked by relevance of their metadata to the query text phrase.

Each text phrase in the seed textual query bank 106 is sent as a query to the metadata-based multimedia search engine 108, and a certain top number of the returned results (for example, around 1,000) are analyzed by other modules in the Universal Learner, as depicted in FIG. 1. In this way, a huge collection of Web documents can be analyzed and correlated without a need for considering all the signals pair wise, therefore in a scalable manner.

The Multimedia Attribute Dictionary of "MAD" 116 is illustrated in FIG. 1. The Multimedia Attribute Dictionary of "MAD" 116 must be built, which is exemplified by the process described below. To illustrate the building of the MAD, the example of a "spoon" is used, such that there is a desire to build a system that learns to automatically recognize the object "spoon" in images. As previously discussed, the required training data is obtained from the Web as aided by a metadata-based Multimedia Search Engine 108. As shown in FIGS. 29A and 29B and discussed in the background section, not all the images annotated with the term "spoon" as returned by Yahoo! Images (equivalently, the metadata-based multimedia search engine 108) actually contain the object spoon. Also, of those that actually contain a spoon, many of them have other objects present in the image. First, these examples can be divided in three categories: (a) the "singletons" in which the image contains essentially only the object of interest, centered in the middle; (b) the "composites" in which the object of interest is present along with other objects; and (c) the "negatives" in which the object of interest is not present or is barely visible. Some examples of these three categories are shown in FIG. 30, all taken from the images returned for the search term "Spoon" in Yahoo! Images.

The difficulty is that, initially, it is not clear to what category or class each of these images belongs. Our approach is to extract segments of these images that are likely related to each other. In general, one might divide each image into a number of segments at various levels. This segmentation process is carried out by an image segmentation module described in FIG. 4, to extract segments of the image that most likely belong to the same object, attribute or feature. An example of such segmentation for some images is shown in FIG. 31. The same idea applies to other domain signals, such as audio, where a speech audio signal, for instance, can be segmented into likely constituent words using an audio segmentation algorithm or the signal might be divided into equal or varying size—possibly overlapping—segments.

Figure 32:
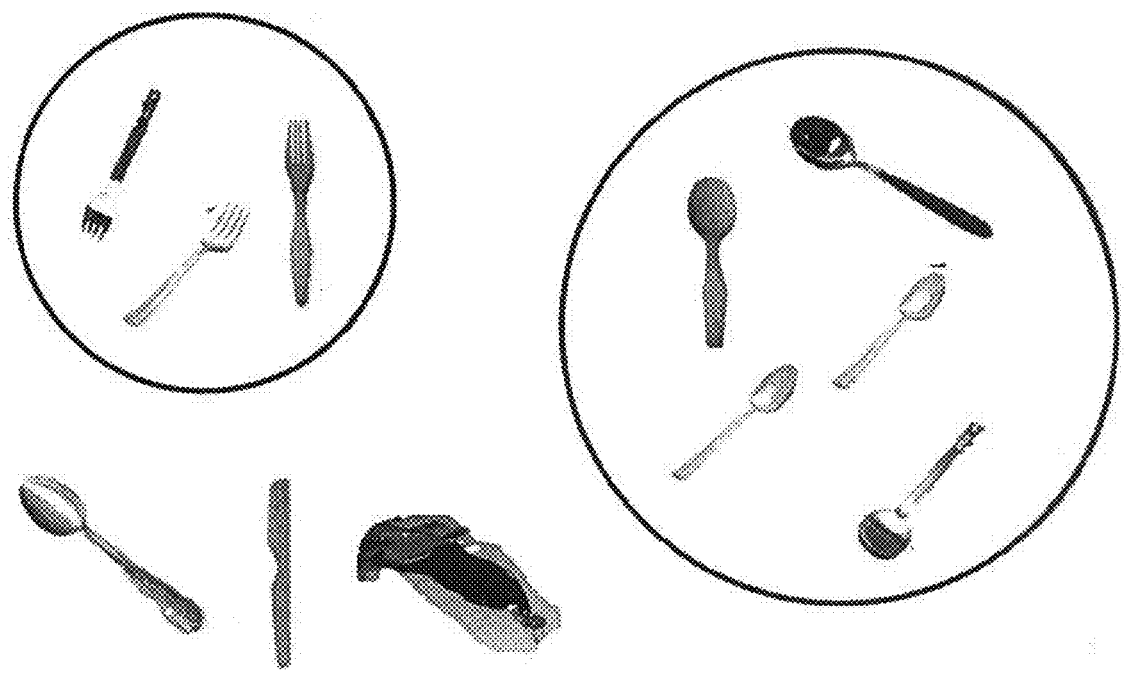
FIG. 32 illustrates clustering of the segments of the images in FIG. 31 into two main clusters. The clustering might be imperfect. For instance, there is one image of a spoon that is missing in the corresponding cluster.

Once the segments are formed, a clustering algorithm (clustering module 112 in FIG. 1) can be run to automatically cluster these segments based on a similarity measure. Several similarity measures have been proposed for images, audio and video. Examples of clustering algorithms include K-Nearest Neighbour (KNN), K-Means algorithms and the like. An instance of clustering for the images in FIG. 31 is shown in FIG. 32.

After clustering, a dominant cluster shall be selected using some criteria; for instance, the size of the cluster or the average clustering coefficient of the clusters.

Since all these images used in this process have been tagged with the term "spoon," the largest cluster of images most likely relates to the actual image of "spoon." Thus, one can add the images in this cluster to a "dictionary of multimedia attributes" and tag them as "spoon," as shown in FIG. 33.

The process in the previous section can be repeated for any other object, attribute or feature to build a "dictionary of multimedia attributes," in which each attribute is associated with a collection of multimedia signals.

In one example of the above process, audio segments of video footages, such as movies, can be used in conjunction with the audio subtitles that accompany them to extract the pronunciation of words. Subtitles and closed captions contain the information of the audio signals in text form and are displayed in synch with the audio and are useful to hearing-impaired audiences. Most movies and live broadcasts come with closed captions. Captions for an audio segment can be regarded as its annotation/metadata.

Given a collection of audio footages with their transcripts, the pronunciations of words in the collection can be extracted. These audio footages might have been extracted from videos with closed captions or subtitles. To extract the pronunciation for a word, say, "Nintendo," one may find all portions of the audio signal that contain the word Nintendo. Then, a word segmentation algorithm (ref. FIG. 9, step 906) is used to segment the audio signal into segments that are likely to encapsulate single words, as in FIG. 34. Then, a clustering algorithm (ref. FIGS. 10, 11) is run on the collection of segments to find a dominant cluster of segments that most likely corresponds to the word "Nintendo," as in FIG. 35.

The dictionary of classifiers 118 is illustrated in FIG. 1. The dictionary of classifiers is built using the Multimedia Attribute Dictionary 116, exemplified by the process described below. Once the dictionary of multimedia attributes is built, one can use it to train classifiers. These trained classifiers are used in the classification module 114 in FIG. 1 and are able to recognize each attribute in the dictionary. In one embodiment, for the collection of images related to each attribute, a feature vector is calculated and a classifier is trained using these feature vectors as positive examples. In one embodiment, Histograms of Oriented Gradients may be used to extract features and Support Vector Machines may be used as the classifier. The collection of these classifiers for all the attributes in the dictionary of multimedia attributes forms the "dictionary of classifiers," in which there is a classifier associated to each attribute. FIG. 36 shows an example entry in the database of classifiers that corresponds to the attribute "spoon."

Further, in yet another embodiment, instead of a dictionary of classifiers, using cross-domain (e.g., text and image) clustering (e.g., FIG. 6) and classification (e.g., FIG. 8) techniques, a unified classification scheme for all the classes can be built as well.

The image segmentation module is shown in FIG. 1 as part of the domain-specific segmentation module 110. An image can be segmented in various ways at various levels by object, attributes, features and the like. FIG. 4 depicts a flowchart for the image segmentation module, which computes object level, attribute level and feature level segments using various techniques.

The process of shaped-based or object level segmentation can be described from an input image in FIG. 4. For an input image, first an edge detection step 402 is used. The edge detection step 402 uses a standard edge detection algorithm (e.g., Canny Edge Detector) to extract edges in the image that is then passed to contour tracing step 404. In the contour tracing step 404, various shapes present in the image are extracted by tracing edges using a contour tracing algorithm, such as Moore Neighborhood tracing. Shapes smaller than a specified size, according to the algorithm used, are discarded in the contour tracing step 404. For each shape extracted above, the bounding box computation step 406 computes a bounding box in the original image; i.e., a rectangle that tightly contains all the pixels in the shape. The bounding box computation step 406 also computes the part of the original image just containing the shape. Based on the geometric location of bounding boxes, the shape tree computation step 408 creates a shape tree where each of the above shapes (and corresponding part in the original image) is a node, and a first node is a child of a second node if its bounding box is totally contained in that of the second. The process in the shape tree computation step 408 outputs a shape tree representation of the original image. Nodes at depth one are various objects—other nodes constitute parts of the objects. A few examples are shown in FIGS. 39-42.

The local interest point-based segmentation process can be described from an input image in FIG. 4. An interest point detection step 412 computes intensity and/or its gradient description around each pixel at various scales and computes the extrema in pixel as well as scale space. Then the pixel locations and respective scales for all these extremas are extracted in the interest point detection step 412. The blob extraction step 414 then segments the original image into many parts around these interest points at their corresponding scales. For example, if a scale at an interest point is σ, a 6*σ circular or square blob around the point is extracted from the original image. Output of this process is interest point blob segments. Note that this segmentation is not mutually exclusive. An example is shown in FIG. 43.

The color-based segmentation process can be described from an input image in FIG. 4. The process is depicted in FIG. 4 by steps 418, 420, 422, 424 and 426 and is as follows. A color histogram is computed around each pixel or a randomly sampled subset of pixels in the color histogram computation step 418. The basis set of colors used for the color histogram computation may be learned using K-means clustering on the corresponding color space (e.g. Red-Green-Blue, Hue-Saturation-Value, Lab, or mixture thereof) with an appropriate distance metric (e.g. L2 distance, L1 distance, Lp distance modulated by Gaussian, scalar product distance, or mixture thereof). A color tracing algorithm 420 is utilized to segment the image into continuous uniform color segments 426. Alternatively, a color histogram similarity graph is created in step 422 where each of the sampled pixels is a node and a weighted edge is created between two pixels if the corresponding color histograms are similar enough according to a metric and the edge weight is defined to be the corresponding similarity score. Once the graph is built, a graph-partitioning or graph-clustering algorithm 424 (e.g., connected components, greedy cliques and the like) is applied to determine which pixels fall in the same segment. An example is shown in FIG. 44.

Face detection/human detection-based segmentation: In another scheme (step 428 and 430 in FIG. 4), an image having multiple faces and human bodies is segmented so each resulting segment contains a single face and or a single body. An example is shown in FIG. 45.

The visual clustering module is shown in FIG. 1 as part of the clustering module 112. FIG. 5 depicts a flowchart for clustering process, as described below.

The visual clustering module begins with a collection of images segmented, as per the image segmentation module in FIG. 4, so each image has object, attribute and feature level segments. The visual descriptor step 502 in FIG. 5 extracts a description for each segment, usually an Euclidean vector. For example, for an object level description, the descriptor could be a 128 dimensional shape descriptor representing the log-polar histogram of shape points around the center of the bounding box of the shape. For uniform color segments, the descriptor could be, say, a 100 dimensional color histogram. For local interest point-based segments, the descriptor could be a histogram of oriented gradients around the interest point at the corresponding scale. For face detection based segments, the descriptor could be a Haar feature descriptor.

The descriptor similarity measure step 504 in FIG. 5 defines and computes a notion of description similarity between all the visual descriptions/segments. For example, the measure could be standard L2, L1 distance; Lp distance modulated by Gaussian; scalar product distance; relative entropy; Earth Mover's distance and the like. The said description similarity measure between two descriptors f1 and f2 may also be computed by a method comprising: mapping each coordinate of f1 to K>1 coordinates of f2 and vice versa; computing a penalty for each such coordinate mapping, wherein the penalty is computed such that the closer coordinate mapping incur smaller penalties and additional penalties are incurred if a part of a coordinate is left unmatched; a total penalty is computed as the sum of matched proportions multiplied by their respective penalties plus the penalties for the unmatched portions; wherein the best matching is found to minimize the total penalty; and wherein the penalty for the best match is declared as the value of the similarity measure. The method may alternatively compute only an approximate matching by optimizing the total penalty approximately.

The similarity measure and scores from the descriptor similarity measure step 504 can be used for clustering the segments in one or more clusters. For example, the K-means clustering algorithm 510, or a graph-based approach using steps 506 and 508, can be used. In step 506, a description similarity graph is built wherein each segment/description is a node. A pair of segments/descriptions in step 506 comprise an edge if the corresponding descriptions are similar enough, as measured by the description similarity measure. Once the graph is built, a graph partitioning or clustering algorithm 508 is applied to obtain visually similar clusters. Examples of graph clustering schemes include connected components, greedy cliques or agglomerative clustering based on optimizing graph modularity. Finally, clusters of size smaller than certain threshold are discarded. Note that a vector quantization of visual descriptors naturally provides another clustering method.

The visual-textual clustering module is shown in FIG. 1 as part of the clustering module 112. FIG. 6 depicts a flowchart for the clustering process.

A pure visual clustering algorithm is applied as described previously in FIG. 5.

The tag aggregation step 602 begins with visually similar clusters 512 in FIG. 5. The textual tags for all images in the cluster are aggregated in 602. For each cluster, confidence scores are computed for a set of text phrases representing how popular they are in the cluster. Tags with a confidence score smaller than a threshold value are discarded in step 602.

The step 604 provides aggregated tag-based indexing of the visual clusters wherein all the clusters are indexed based on their tags computed in step 602. The indexing process means that, for each text phrase w, the entries contain all the clusters whose aggregated tag is the same as or similar to w.

There are iterative cluster building and refinements. Iterative cluster building and refinements means for each pair of clusters that share at least one aggregated tag, step 608 creates a new cluster by computing a subset of elements of both clusters that satisfy some visual and textual similarity criterion. For instance, in one embodiment, the intersection of the two clusters make up the new cluster and a new tag is computed for this cluster by aggregating only the tags of the members of the new cluster. The process can be repeated until a specified level, or until no new cluster, can be constructed.

A hierarchy of multi-domain (visual-textual) similar clusters 610 is thus obtained via the above process in FIG. 6, and clusters at each of the iteration make up part of a tree representation of the clusters.

Note that the role of text and image can be reversed in FIG. 6. One can use a standard text clustering and a visual aggregation module (which includes a vector quantizer for the visual descriptors; i.e., these quantized visual descriptors will work like textual words in case of textual tag aggregation).

The visual classification module is shown in FIG. 1 as part of the classification module 114. FIG. 7 depicts a flowchart for classification process. Once the visually similar clusters are computed using modules in FIG. 5 and FIG. 6, a dictionary of classifiers or a unified classifier can be built for detecting attributes represented by these clusters. FIG. 7 illustrates a technique where supervised attribute learning techniques, such as support vector machines (SVM), are used. To train the classifier for an attribute, its cluster members are used as positive examples and random images from other clusters are used as negative examples. Further, the same visual descriptor 502, which was used in the visual clustering step, may be used as input to the SVM to represent the corresponding examples. Instead of or in addition to SVM, supervised attribute learning techniques such as k-Nearest-Neighbors algorithm, Neural Networks and the like may also be used.

One classification scheme is unified classification based on important visual bigrams analysis. The unified classification scheme based on important visual bigrams analysis is motivated by the idea that by the very nature of visual similarity in the classes (which are basically the visually similar clusters representing an attribute, object and the like), there must exist a set of visual features that have a statistical bias towards this class as compared to a random set of images.

The unified classification scheme based on important visual bigrams, as illustrated in the flowchart of FIG. 8, is as follows. Step 804 computes interest point-based features (e.g., SURF) for all images from all clusters. Steps 806 and 808, sample a representative subset of these features, and this representative subset of features are used to build a vector quantizer for the feature space. For illustration purposes, there "are Q" bins. Each quantized bin is called a vunigram (visual unigram), and each pair of unigrams is combined to make $Q^2$ vbigrams (visual bigrams), which gives a vbigram vector quantizer 810. Step 812 computes the statistics of each vbigram across all the images in all the clusters, both globally as well as locally, to each cluster. This gives GDF (global document frequency) and CDF (class/cluster document frequency) for each class. Thus, GDF of a vbigram is the number of images the vbigram appears in, and the CDF of a vbigram for a cluster is the number of images in that cluster that this vbigram appears in. Then, in step 814, a number of top vbigrams, called important vbigrams, are selected for each cluster based on their relative CDF. For each class—for each of its important vbigrams—a confidence score is calculated by module 816, which indicates how important this vbigram is for that class. In one embodiment, the confidence score can be defined as $\log_2$ $$\left(1 + \frac{CFD}{GDF}\right).$$

This process gives us a unified visual classifier 818.

When a new image is to be classified, its features are calculated and quantized and vbigrams are constructed. For each class, a classification confidence score is calculated based on how many important vbigrams from the class appear in this image and with what confidence scores. The image is classified as belonging to the classes that have high classification confidence scores, and with confidence in that order. In one embodiment, the classification confidence score is the sum of important vbigrams' confidence scores for that class.

Similar classification schemes can also be built, wherein, instead of concept of a vbigram, quantized visual features are combined with text phrases (single or multiple words) to define cbigrams (composite bigrams) and the cbigrams are used instead of vbigrams in the scheme of FIG. 8.

One advantage of the unified classified scheme of FIG. 8 is that the scheme provides a confidence of belongingness to the classes. Whereas, the scheme of FIG. 7 provides only the information on whether the image does or does not belong to a class.

The audio segmentation module is shown in FIG. 1 as part of the domain-specific segmentation module 110. FIG. 9 depicts a flowchart for this module that computes audio segments at various levels using various techniques Like in the case of an image, an input audio can also be segmented in various ways at various levels—global structure level (e.g., speech; music (e.g., vocal, instruments); gestures (e.g., laughter, crying, whistling); noise and the like)), word level if it is speech signal, note level, chord level, timbre level, frame or feature level, and the like.

First, the input audio is sent through a high-level audio type discriminator 902, which detects whole or parts of the audio that are of various audio types, such as speech, music, gestures, noise and the like. In a first type of segmentation, the speech part of the audio can be analyzed using a keyword spotting algorithm 906 that detects the words and phrases in the signal and segments the audio accordingly.

In one example, such keyword spotting can be achieved by building Hidden Markov Models for words and phonemes, such as in publically available tool Sphinx4. This gives us word level segments of the audio along with textual annotation of the segments. These textual annotations of segments may later be used for aggregating and computing a representative tag to list in the multimedia attribute dictionary after the audio clustering step.

In another type of segmentation, the musical part of the audio can be analyzed via an onset detection scheme using various kinds of pitch features, chroma features, such as CENS (chroma enhanced normalized statistics) and spectral flux features to detect note level segments (step 908 & 910).

In yet another segmentation scheme, the music can be segmented into various chords by utilizing a chord spotting algorithm 912. Such chord spotting schemes can be developed by building Hidden Markov Models for chords, wherein the training data could be automatically generated by using symbolic data, such as MIDI (Musical Instrument Digital Interface) files via harmonic analysis and a synthesizer.

Module 914 provides yet another way of segmenting a musical signal in tonal segments, which is very close to how humans perceive music (i.e., timbre level, polyphonic and the like), and features such as MFCC (mel-frequency cepstral coefficients) can be used to achieve this task.

Further, 916 provides a bag of frames-based segmentation technique, wherein the audio signal is first divided into sets of consecutive frames sampled at a particular rate, which make up the segments, and a feature may be calculated to represent each such segment. Further, the input audio signal can also be left at very high-level segments, such as music, speech, gestures or combinations thereof, and structure of such high-level segments may be described by, say, histogram of pitch, chroma, MFCC or local energy features.

The audio clustering module is shown in FIG. 1 as part of the clustering module 112. The audio classification module is shown in FIG. 1 as part of the classification module 114. The audio clustering and classification modules are very similar in structure to visual clustering and classification techniques as evident from flowcharts in FIGS. 10, 11, 12 and 13. FIG. 10 depicts a flowchart for the audio clustering process. FIG. 11 depicts a flowchart for the audio-textual clustering process. FIG. 12 depicts a flowchart for the audio classification process. FIG. 13 depicts a flowchart for an alternative audio classification process. In the audio clustering and audio classification modules, the visual features and descriptors are replaced by aural features, such as pitch features, CENS, MFCC and the like. Description similar measures could be Euclidean metrics, edit distance, earth mover's distance or that based on DTW (dynamic time warping) or diagonal matching and the like. Further, concepts of vunigram and vbigram are now replaced by aunigram (aural unigram) and abigram (aural bigram), respectively. For audio description/feature vector quantization, one could use LBG algorithm or its improved versions. There is an interesting extra knowledge available in the case of speech audio, wherein the tag aggregation module 1102 could be further enhanced using the keyword spotted for the corresponding audio signals; i.e., while aggregating the tags for clusters, the corresponding textual words or phrases as detected by a keyword spotting algorithm can be used as well.

Note that the role of text and audio can be reversed in FIG. 11. One can use a standard text clustering and an aural aggregation module (which includes a vector quantizer for the aural descriptors; i.e., these quantized aural descriptors will work like textual words in case of textual tag aggregation).

A video signal usually consist of signals in various multimedia domains, such as image, audio and motion as well as the temporal, spatial and spectral correlations among these constituent signals. Any video segmentation can utilize domain-specific segmentation schemes, such as in FIG. 4 for visual frames and FIG. 9 for audio component, as well as cross-domain segmentation where segmentation in one domain is guided by signal features in another domain. For example, in a visual frame-precise segmentation scheme, frames can be sampled at an appropriate rate and each frame can undergo an image segmentation algorithm. Further, motion change or activity-based segmentation can also be obtained. In yet another scheme, a bag of consecutive frames can be analyzed to detect the part of the frames that are in motion or activity and this can be used as a method to detect foreground vs. background. The whole process of video segmentation at various levels is illustrated in FIG. 14.

Video clustering can also be achieved, either by purely visual or aural clustering or cross-domain clustering. The flowchart for pure visual or aural clustering (may be guided by text) are the same as in FIGS. 5, 6, 10 and 11. A preferred embodiment of cross-domain clustering is depicted in the flowchart in FIG. 15. In FIG. 15, video clustering via visual signal is being guided by aural knowledge of the corresponding visual signals. Alternatively, the role of visual and aural can be reversed, such that any two different domains or feature types can take the role of visual and aural for that matter. Thus, there exists a variety of video clustering algorithms.

Video classification schemes can be designed in a manner very similar to that in the case of image and audio using ideas as described in FIGS. 7, 8, 12 and 13. FIG. 16 depicts a flowchart for the video classification module process. Each video cluster is considered as a class and it can be tagged with text phrases, visual words (via vector quantization of visual descriptors) and aural words (via vector quantization of aural descriptors). The supervised learning algorithms (e.g., SVM) can be utilized where cluster members make up the positive examples and a random sample from other clusters make up negative examples. Further, a method based on the idea of a bias or affinity of a subset of features towards a class can also be exploited as depicted in the flowchart of FIG. 16. The process in FIG. 16 is very similar in structure to FIGS. 8 and 13. However, in the process of FIG. 16, there are a multitude of choices for the feature types T1 and T2 from across multitude of signal domains D1 and D2. Note that T1 and T2 may be the same, and, similarly, D1 and D2 may be the same as well. Concepts of vbigram of FIG. 8 is now replaced by mbigram (multimedia or multi-domain bigram), where in general the unigrams may come from different signal domains. The process gives us a variety of video classifiers in an unified framework.

The co-occurrence analysis engine is shown in FIG. 1 at 120. FIG. 17 depicts a flowchart for the co-occurrence analysis. As stated previously, the intra-domain correlations can be discovered using domain-specific analysis tools, such as the modules described above. Further, the cluster discovery and classification modules described above create the nodes within the Multimedia Brain, as well as some links that are obtained by analyzing the signal similarity in single signal domain (i.e., intra-domain relationships). The inter-domain relationships, however, have to be learned by examples. Fortunately, there is an abundance of multimedia data on the Web that contains signals in two or more domains (e.g., text Web pages with images in them, videos with audio, visual and motion components and the like).

The co-occurrence of signals in a multimedia document coming from a large collection, such as the Internet, allows for the discovery of cross-domain relationships and intra-domain relationships beyond domain-specific signal similarity analysis. If two signals appear together often in a large collection of multimedia data, it follows that the signals must be related. These relationships may be semantic or contextual. The more often two signals appear together, it follows that the more closely they are related. The definition of co-occurrence may vary. For example, two objects appearing together in an image gives us spatial proximity-based co-occurrence, whereas two notes appearing consecutively in music gives us a temporal proximity-based co-occurrence. Thus, depending on the definition of a node (a signal segment, an object, a feature represented by a quantized vector and the like), the definition of a document (e.g., a Web page, a one-minute part of a video and the like) and definition of co-occurrence (spatial, temporal or both), there are a multitude of relationships that are computed to be a part of the MMB.

The flowchart in FIG. 17 illustrates the co-occurrence analysis engine. The co-occurrence analysis engine essentially computes the frequency statistics of all the entries in MAD and the co-occurrence statistics of each pair of entries in MAD. The frequency statistics and the co-occurrence statistics are computed by a linear scan of the given collection of the multimedia data, one document at a time. For each document D in the collection, step 1702 uses the module 110 to segment D into various visual, aural, textual and video segments S1, S2 to SK, depending on what multimedia content document D contains. Then, the step 1704 uses module 114 to classify each segment Si into one or more classes. For each such class Ci, 1706 checks if there is a node in the MMB and creates a node in the MMB if one is needed (step 1708). Accordingly, a weight to the node is assigned or updated in step 1710 using a node weight function. In a simple scenario, the node weight could be the frequency of the node. For each pair of segments (Si, Sj), step 1712 checks if corresponding classes (Ci, Cj) are already linked in the MMB or not and creates a link if needed as long as the pair (Si,Sj) satisfy a co-occurrence criterion (step 1714). Accordingly, a weight to the link is assigned or updated in step 1716 using an edge weight function. In a simple scenario, the edge weight could be the co-occurrence statistics of the pair of nodes (Ci, Cj); i.e., number of times the pair co-occur in a document as per the co-occurrence criterion. The co-occurrence criterion may be based on spatial proximity, temporal proximity, user activity wherein two segments s1 and s2 are said to co-occur if the same user or users with similar interests have engaged with both s1 and s2, or high level intention analysis wherein two segments s1 and s2 are said to co-occur if they indicate similar intention, and mixtures thereof.

Once all documents in the given collection are processed, an MMB is built. The process of building an MMB is incremental, and combinations of steps 1702 through 1716 can be used to update the MMB as new data becomes available. The signals that cannot be classified into one of our classes from MAD, are collected over time. When this collection of data becomes significantly large, the whole universal learner of FIG. 1 can be run on the new collection. After running the universal learner on the collection, then the MMB is updated via FIG. 17 using the new collection, or the UL can be completely rerun from scratch on the total data collection, new and old, to create a bigger and richer MMB.

In preferred embodiments of the present disclosure, the Multimedia Brain can be used for a variety of applications, including, but not limited to, signal similarity search, signal classification, including object detection, to perform composite (i.e., cross-domain) queries (for instance, a query with a text term and an image) to match multimedia signals to advertisement signals, to build multimedia recommendation systems for ecommerce and to provide an intent or context summary of any Web document comprising of any combination of multimedia signals.

One can perform multi-attribute searches in which query terms may come from different domains. A method for performing multi-attribute searches in which query terms may come from different domains are illustrated in the flow-chart of FIG. 18.

A search engine is considered that allows for a search using query signals as input. An image of a Blue Jay is entered as query into the search engine.

Due to the fact that the query is in the image domain, the image similarity search algorithm is used to find the most similar image in the Image Domain.

Once the corresponding image in the "Image Domain" is found, the corresponding image can act as our door into the knowledge in Image domain and from there into other domains. One way of presenting the data is to put the results of each of the three categories of data into hierarchies. The upper levels of this hierarchy correspond to closer relationships to the query item; each item in a lower hierarchy is related to the query item through an item in the upper hierarchy. FIG. 24 shows the top five hierarchies associated with the above image query. Similarly, the first 5 hierarchies for the word "melody" are shown in FIG. 25.

Now suppose one is interested in performing a multi-attribute search, in which each attribute might come from a different domain. For instance, the image of a Blue Jay+ "melody". The multi-domain representation allows one to perform such a search, for instance, by intersecting the levels of the hierarchies. The result of this query is shown in FIG. 26.

Another method to perform a multi-attributes search is to find a path from one query item to the next. Consider again a multi-attribute query for the image of a Blue Jay+"melody". To resolve this query, one might start by resolving each query term in its own domain. The image of a Blue Jay will be mapped to another image of a Blue Jay in the image domain. The term "melody" can also be looked up in the word domain. Then, a path can be found from the second image of the Blue Jay to Melody in the Multimedia Brain. This path might be selected, for instance, through a shortest path algorithm, as indicated by the path of "red dotted line" in FIG. 27. The result of this composite query can be the nodes along this path, together with their nearest neighbours, as shown in FIG. 28.

The ability to perform a multi-domain search has obvious applications in the Web search engines. Currently, search engines mainly rely on textual descriptions for search items. Experimental systems for content-based image search or content-based audio search also exist. An embodiment of the present disclosure can be used to extend the capabilities of search engines beyond their one-dimensional, single domain search by allowing the users to describe their items of interest using attributes that come from different domains, such as text, sound and images.

Given a multimedia content (one or more multimedia documents) and an inventory of advertisement signals in the one or more, and same or different, domains, Multimedia Brain (MMB) recited in this disclosure can be used to find the subset of advertisement signals that are most relevant to the given multimedia content. In one embodiment, the given multimedia content is analysed and mapped to various nodes and links in the MMB, and the same is done for all the ad signals. The ad signals with better similarity to the given multimedia content in the MMB, according to a graph theoretic metric, are selected to be served on/in or in response to the given multimedia content. For instance, a video clip posted by a user may be analyzed to find the related main concepts in the MMB that can be mapped to one of the ad keywords by performing composite queries for audio and visual contents in the video. The higher order relationships in the MMB may be well utilized in this process. For instance, if a spoon is detected in an image, not only ads related to purchasing Spoons will be shown, but also those related to Forks may be shown as well. The process is illustrated in the flowchart depicted in FIG. 19.

With the explosion of multimedia content on the Web and, in particular, the surge of non-textual content, such as images and video on sites like YouTube, Flickr and various news publisher sites, it is becoming extremely important to curate and understand the plethora of these constantly increasing non-textual content. On the other hand, most of the content understanding techniques have been largely limited to textual analysis until now, and true multimedia understanding across various domains, such as image, audio and video, has been a far cry. The method recited in this disclosure can be used to alleviate this problem and to provide an understanding of the multimedia content. The Multimedia Brain presented in this disclosure encompasses a variety of contextual, functional or other higher order relationships across multimedia attributes and signals in various domains. For example, a sports news video containing scenes and commentary from multiple sports, such as football, baseball, tennis, basketball or cricket, can be summarized at various levels of intent and context. For example, at a very high level that the given video is about sports and which part correspond to which sport, or at more specific level, such as video frames corresponding to the cricket section, where there is a very interesting event such as a six, four or a catch. Such context and intentions at various levels are obtained by segmenting the given video into various components as per module 110—classifying them and mapping them to the nodes in the brain using 114 and then by analyzing the MMB in the neighborhood of those nodes. A collection of Web documents having multimedia contents can be summarized in a similar manner. Such summary of video or multimedia content collection in general can be used for many interesting applications. For example, it can enable systems that can handle sophisticated queries, such as "show me the video parts where Kobe Bryant does a 3-point shot" or "show me all the video parts and images where Natalie Portman is wearing a blue dress and suggest me places to buy such a dress online" and the like.

Given a huge inventory of multimedia description of items such as those found on ecommerce sites like Amazon.com, Overstock.com and Yoox.com, it is not an easy task, computationally or conceptually, to find the most relevant items in the inventory for a given item. Most systems currently in place use text analysis for this purpose. Even if a single domain matching algorithm is available, it is not computationally feasible to compare each pair of items' (of $O(N^2)$ complexity for all computations and $O(N)$ for recommendation per item if there are N items in the inventory). The Multimedia Brain presented in this disclosure enables a computationally efficient (of $O(N)$ for all items and a constant time, i.e., O(1) for recommendation per item) and high-quality matching and recommendation algorithms thereby enabling high quality "recommendation by example," meaning the user provides example by either uploading a multimedia document or by selecting one available on the site. To achieve this, each item is first segmented into one or more signals in various domains and is classified and mapped to the Multimedia Brain. At the end, each node of the MMB corresponds to only a very small set of items from the whole collection (of a constant order on average) along with a relevance score. If there are too many items, only the top K items are kept. Now only those pairs of items are compared for being into each other's recommendation set, which share certain neighborhood in the MMB.

All documents cited in the Detailed Description are, in relevant part, incorporated herein by reference; the citation of any document is not to be construed as an admission that it is prior art with respect to the present disclosure.

While particular embodiments of the present disclosure have been illustrated and described, it would be obvious to those skilled in the art that various other changes and modifications can be made without departing from the scope of the disclosure. It is therefore intended to cover in the appended claims all such changes and modifications that are within the use.

What is claimed is:

1. A method utilizing at least a computer processor for building a multimedia association graph comprising:
    collecting a set of multimedia documents;
    selecting at least one subset within the collected set of multimedia documents, the subset comprising at least one signal;
    creating a set of segments using a segmentation method, wherein the segmentation method segments the at least one signal into at least one level segment selected from a group consisting of: object level segments, attribute level segments, and feature level segments;
    clustering the set of segments to create a cluster set;
    building a dictionary of multimedia attributes, wherein each attribute corresponds to a cluster in the cluster set;
    building a dictionary of classifiers comprising at least one entry, wherein each entry classifies an attribute in the dictionary of multimedia attributes;
    creating a graph wherein each node corresponds to an attribute in the multimedia attribute dictionary and a weight of a particular edge or link between two nodes indicates a degree of similarity between two corresponding attributes; and
    building a multimedia recommendation system, wherein the building comprising:
        receiving an inventory of multimedia descriptions of items;
        segmenting a multimedia description of each item in the inventory in at least one segment in at least one signal domain;
        mapping all segments of the inventory to the nodes in the multimedia association graph;
        computing a set of relevant nodes based on a union of the nodes mapping to the segments for the items in the inventory;
        computing top K items for each relevant node based on how well the multimedia descriptions mapped to each relevant node;
        computing a first set of recommendations for each item based on a union of all top items that correspond to the set of relevant nodes whose the top K items contain the item; and
        computing for each item a similarity score between a description of each item and a description of each item in the first set of recommendations;
        computing top L items from the first set of recommendations based on the computed similarity score.

2. The method of claim 1, wherein the inventory of multimedia description of items is selected from a group consisting of visual, aural, video signals and mixture thereof.

* * * * *